(12) United States Patent  
Green

(10) Patent No.: US 8,162,495 B2
(45) Date of Patent: Apr. 24, 2012

(54) SYSTEM AND METHOD OF FOCUSING ELECTROMAGNETIC RADIATION

(76) Inventor: Steven Russell Green, Wheaton, IL (US)

( * ) Notice: Subject to any disclaimer, the term of this patent is extended or adjusted under 35 U.S.C. 154(b) by 569 days.

(21) Appl. No.: 12/365,094

(22) Filed: Feb. 3, 2009

(65) Prior Publication Data
US 2010/0195227 A1  Aug. 5, 2010

(51) Int. Cl.
G02B 5/10 (2006.01)
(52) U.S. Cl. ........................................ 359/853
(58) Field of Classification Search .................. 359/853; 126/576
See application file for complete search history.

(56) References Cited

U.S. PATENT DOCUMENTS

| | | | |
|---|---|---|---|
| 3,466,119 A | 9/1969 | Francia | |
| 4,172,443 A | 10/1979 | Sommer | |
| 4,765,726 A | 8/1988 | Johnson | |
| 4,968,355 A | 11/1990 | Johnson | |
| 5,542,409 A | 8/1996 | Sampayo | |
| 5,787,878 A | 8/1998 | Ratliff | |
| 5,862,799 A | 1/1999 | Yogev | |
| 6,276,359 B1 | 8/2001 | Frazier | |
| 6,349,713 B1 | 2/2002 | Toyama | |
| 6,820,611 B2 * | 11/2004 | Kinoshita | 126/576 |
| 6,923,174 B1 | 8/2005 | Kurz | |
| 6,959,993 B2 | 11/2005 | Gross et al. | |
| 7,192,146 B2 | 3/2007 | Gross et al. | |
| 2004/0074490 A1 | 4/2004 | Mills et al. | |
| 2007/0240704 A1 | 10/2007 | Prueitt | |

* cited by examiner

Primary Examiner — Euncha Cherry
(74) Attorney, Agent, or Firm — Erickson Law Group, PC

(57) ABSTRACT

A tracking system for reflecting electromagnetic radiation from a source to a target area, having at least one reflecting surface or mirror mounted to a support that fixes the reflecting surface orientation to focus electromagnetic radiation on the target area when the reflecting surface is at a first location at a first predefined time. The system has a path with at least the first location and a second location. The reflecting surface is movable along the path to maintain focus on the target area. The reflecting surface may have an orientation with a fixed declination angle and fixed hour angle. The source may include a moving source such as the Sun.

20 Claims, 14 Drawing Sheets

FIG. 6A

| | | A | B | C | D | E |
|---|---|---|---|---|---|---|
| 651 | | | | | | 25 |
| 652 | | | | 4.683 | 10 | 30 |
| 653 | | 4.683 | 10 | 15.475 | 15.475 | 35 |
| 654 | | 10 | 15.475 | 21.203 | 21.203 | 40 |
| 655 | | 15.475 | 21.203 | 27.297 | 27.297 | 45 |
| 656 | | 21.203 | 27.297 | 33.894 | 33.894 | 50 |
| 657 | | 27.297 | 33.894 | 41.179 | 41.179 | 55 |
| 658 | | 33.894 | 41.179 | 49.394 | 49.394 | 60 |
| 659 | | 41.179 | 49.394 | 58.885 | 58.885 | 65 |
| 660 | | 49.394 | 58.885 | 70.157 | 84 | 70 |
| 661 | | 12.38182 | 9.88182 | 7.38184 | 4.88184 | |

650

670

SYSTEM AND METHOD OF FOCUSING ELECTROMAGNETIC RADIATION

FIELD OF THE INVENTION

The invention involves focusing electromagnetic radiation from a source to a target.

BACKGROUND OF THE INVENTION

When a stationary light source or an electromagnetic radiation source impinges a planar mirror, the reflection of the light source is projected along a line defined by the location of the mirror relative to the light source, and the orientation of the mirror plane relative to the light source. Placing a screen in the path of the reflected light will show an image of the light source on the screen at a specific location relative to the mirror and source locations. Keeping these four attributes constant (source location, mirror location, mirror plane orientation, screen location) will result in the source image on the screen to remain stationary.

If the location of the light source, the location of the planar mirror, the orientation of the mirror plane or the location of the screen is changed, the image of the light source on the screen will move to a new location on the screen. In order to move the source image back to its original location on the screen, one other attribute or a combination of the other attributes must be changed.

For example, if the light source location is changed, the image on the screen will move to a new location. To move the image back to the original location on the screen, the mirror plane orientation might be changed while keeping the mirror location and screen location constant. Alternatively, the screen location might be changed while keeping the mirror plane orientation and mirror location constant. Finally, a last solution would be to move the mirror location while keeping the screen location and the mirror plane orientation constant.

Focusing Methods for a Moving Light Source

Current focusing systems for tracking moving light sources involve rotational motion of part or all of the focusing system. In a single axis tracker—for a light source moving in a predictable arc—the focusing system—typically a parabolic or Fresnel lens—must rotate around a single axis parallel to the axis of rotation of the source. The axis can be placed anywhere in the system, as long as it is parallel to the source rotational axis. In most applications it is desirable to keep the focus point stationary in space since the energy absorbing medium is located there with its relatively complex and potentially massive interfacing elements such as wiring, conduits (fluid pipes), turbines, or other power generating mechanical items. The focus is thus made to reside on the rotational axis which means the mirror must traverse a circular arc as it tracks the moving light source, and the overall three-dimensional space utilized around the mirror is significant.

In discrete planar array systems, the focus point is also stationary by design and a plurality of individual planar or curved mirrors are kept stationary in a location on the ground and close to the ground, eliminating the need to rotate around the focus. In large mirror array systems there may be thousands of planar or curved mirrors. However, each mirror must be individually and independently rotated and tilted to track the moving light source. While the discrete planar mirror system can reside close to the ground, they still have complex 3-dimensional movement associated with the individual mirrors in the system as both azimuth and altitude angles of the mirror must be adjusted along two axes as the light source moves.

2-Axis Tracking Systems for Planar Arrays

The present inventor has recognized drawbacks with existing 2-axis solar concentrating systems. Much of the existing art utilizes 2-axis tracking in planar array tracking systems. 2-axis tracking requires many components and attributes to be effective. Generally, these 2-axis systems provide a hinge, pivot or gimbal to allow the mirror to rotate on one or two axes, one for vertical (altitude) and one for horizontal (azimuth) rotation. This requires the mirror to be suspended at a fulcrum at the end of a lever arm, which creates a mechanical oscillator system with an inherent mechanical instability. Each mirror sweeps an operational "keep out" area in the shape of a sphere, so that the installation suffers the classic space inefficiency of packing of spheres relative to packing of rectangular prisms. Second, a linkage mechanism is required to actuate changes in rotation on both axes, and the linkages must be affixed to the mirror mechanically and without interference with other elements of the mechanical system. Third, motors with geared shafts must be implemented, one for each axis, to drive the linkage actuators. The installation of linkages and motors places a lower limit on how small the mirror system can be, since space must be reserved for these elements.

Limitations of Two-Axis Systems

The present inventor has recognized limitations associated with existing 2-axis solar concentrating systems. A typical 2-axis tracking system for a planar mirror array will have a relatively large overall component count due to the multiplicative nature of the design, and as such creates challenges to scale the system to very large apertures (total surface area of sunlight captured). The component count for a single mirror system is multiplied by the number of mirrors in the complete system, so as the effective aperture area increases for a set individual mirror size, the total system component count scales in a square law relationship. For example, to double the aperture and thus the power collected, one must quadruple the number of mirrors and so the overall system part count. This translates to a geometric increase in material cost as the aperture is increased. The relatively large component count in a scaled-up system also translates to increased joint count and limitations in overall mechanical reliability such that the system will bear ongoing maintenance cost when in use. Also, a higher part count generally translates to a higher manufacturing time and cost, so the system cost would benefit from the lowest part count possible. Another drawback to a suspended mirror in a 2-axis heliostat design is that in very large mirror applications, the mirror will actually deform (sag) under its own weight around the fulcrum point of suspension.

Several patents have attempted to solve some of the problems associated with 2-axis systems described above.

U.S. Pat. No. 3,466,119 (Francia) discloses a system which attempts to simplify tracking by using a triangulation design that places the mirror into correct initial orientation using telescopic sighting on the desired focus at calibration. While this appears to ultimately simplify the planar array tracking process by reducing tracking adjustment to a single axis, its high part count and associated number of moving joints along with the intricacy of the mirror carrier assembly and manual telescope-enabled calibration suggest a high manufacturing cost associated with the product. An adjustment method for compensating for annual Sun declination angle variation is included in the design, but again involves several moving parts and associated many fulcrum points, adding further to product cost.

U.S. Pat. No. 4,172,443 (Sommer) discloses a mathematical relationship that suggests a means for simplifying the tilt and rotation control of individual stationary mirrors in a planar array by exploiting a natural symmetry in mirror tilt angle components as governed by laws of optical reflection. Although this patent uses a mathematical relationship to allow grouped analog control of a mirror subset, each mirror still requires individual mechanical control of its tilt and rotation components to track the Sun, thus retaining the 2-axis tracking method and therefore remains complex when reduced to practice.

U.S. Pat. No. 5,862,799 (Yogev) discloses a system for controlling individual mirrors in a stationary heliostat mirror field. The fundamental method disclosed is active optical sensing, i.e. while the field is in operation. The imaging aperture reduces the efficiency of the concentrator since part of the focus is consumed by the aperture. Two-axis operation is retained.

U.S. Pat. No. 5,787,878 (Radiff discloses a system which moves a complex of mirrors around a central focus axis and adjusts mirror tilt angles continuously to track the Sun. The system of the '878 patent retains the complex 2-axis design described above, with many mechanical linkages and moving parts to alter both mirror rotation and tilt throughout the tracking period. In addition, this system organizes planar mirrors into separate groups of concave geometries which require complex calibration during manufacturing. The system's use of a hood to capture stray Sun rays accounts for rays inaccurately reflected from the concentrator system. Lastly, the system is not aperture efficient, as large areas of useful sunlight can be left uncaptured throughout the tracking period, and only a centrally located focus can be utilized.

U.S. Pat. No. 4,765,726 (Johnson) and U.S. Pat. No. 6,923,174 (Kurz) disclose transmissive tracker systems which dynamically translate a thin film containing a lens pattern across an aperture to establish light concentration onto a focus. The systems may use either ancillary lenses (Johnson), cylindrical shape (Johnson), or tilt adjustment for operation. These systems however are not easily scalable to very large apertures without introduction of a very large, heavy and expensive lens, or large support elements to maintain the shape of the film which limits its aperture efficiency (i.e. the overall structure is significantly larger than the aperture of the system). Further, the transmissive nature of these concentrators disclose that the aperture be suspended above the focal point, creating limitations in the form of increased wind resistance and space utilization. Longevity requirements of the transparent film material with continuous exposure to the elements, such as ultraviolet light, temperature cycling, and moisture or precipitation, would increase cost in terms of either ongoing maintenance, use of a proprietary robust material, or as Johnson suggests, ancillary protective structure which adds cost and reduces performance.

U.S. Pat. No. 6,959,993 (Gross) and U.S. Pat. No. 7,192,146 (Gross) disclose devices that incrementally and serially adjust the orientation of single mirrors in a heliostat array using a traveling motorized crank that mates with individual turnbuckles in mirror mounts in the array. While this patent describes a new method for translating a control motor within an array, the system uses conventional methods by adjusting mirror tilt and rotation.

The present inventor recognizes that it would be desirable provide a solar concentrator system and method having reduced complexity. The present inventor recognizes that it would desirable to provide a system where the mirrors may have a fixed angle orientation.

SUMMARY OF THE INVENTION

The concentrator system of the present invention applies specific mathematical relationships to correlate Cartesian, altazimuth and celestial coordinate systems for tracking the Sun or a source that emits, reflects, refracts, or otherwise emanates acoustic or electromagnetic radiation. In one embodiment, the system continuously tracks the Sun. As the sun moves along its arc in the sky as the Earth rotates, its continuously changing celestial position is along a single line of declination and at a rate of 15 degrees per hour. Thus at a given moment in time, the Sun will have specific celestial coordinates, represented by the hour angle and declination angle. These celestial coordinates are used to map the terrestrial locations of a mirror relative to a target area or target location and move the mirror so that the Sun's reflection focuses on the target as the Sun moves. In one embodiment, the mirror movement is accomplished without altering the tilt or rotation of the mirror as the rotationally fixed mirror is moved into a new position.

Much of the complexity, cost, stability and reliability of a prior art 2-axis planar tracking system is proportional to the part count of the mirror carrier assembly. The system of the present invention has a part count that is reduced and the assembly and calibration of the system is simplified. In one embodiment, this invention reduces complexity in relation to the 2-axis rotational motion systems by replacing 2-axis motion with translational motion. Translational motion is the movement of an object through space without rotation or tilt. The use of translational movement reduces mirror mount complexity, the number of required components, and simplifies the assembly process.

Further, a mirror angle calibration method for manufacturing is simplified by using a laser projection procedure for rapid establishment of mirror angles. In one embodiment, Sun tracking in the present system is achieved by translating individual planar mirrors of fixed orientation along a pre-defined path in a geometric plane, eliminating the need for mirror rotation during daily tracking. This reduction in complexity translates to lower cost, smaller profile, and increased focus efficiency due in part to the closer packing of rectangle mirrors, for a given surface area used by the system. Lastly, mechanical stability is greatly improved since, by virtue of zero rotation requirements, the mirror is mounted without the lever arms and fulcrums typically required in the prior art heliostats.

Numerous other advantages and features of the present invention will become readily apparent from the following detailed description of the invention and the embodiments thereof, from the claims, and from the accompanying drawings.

BRIEF DESCRIPTION OF THE DRAWINGS

FIG. 6A is a table representing a subset of values used to map FIG. 6;

DETAILED DESCRIPTION

Figure 1:
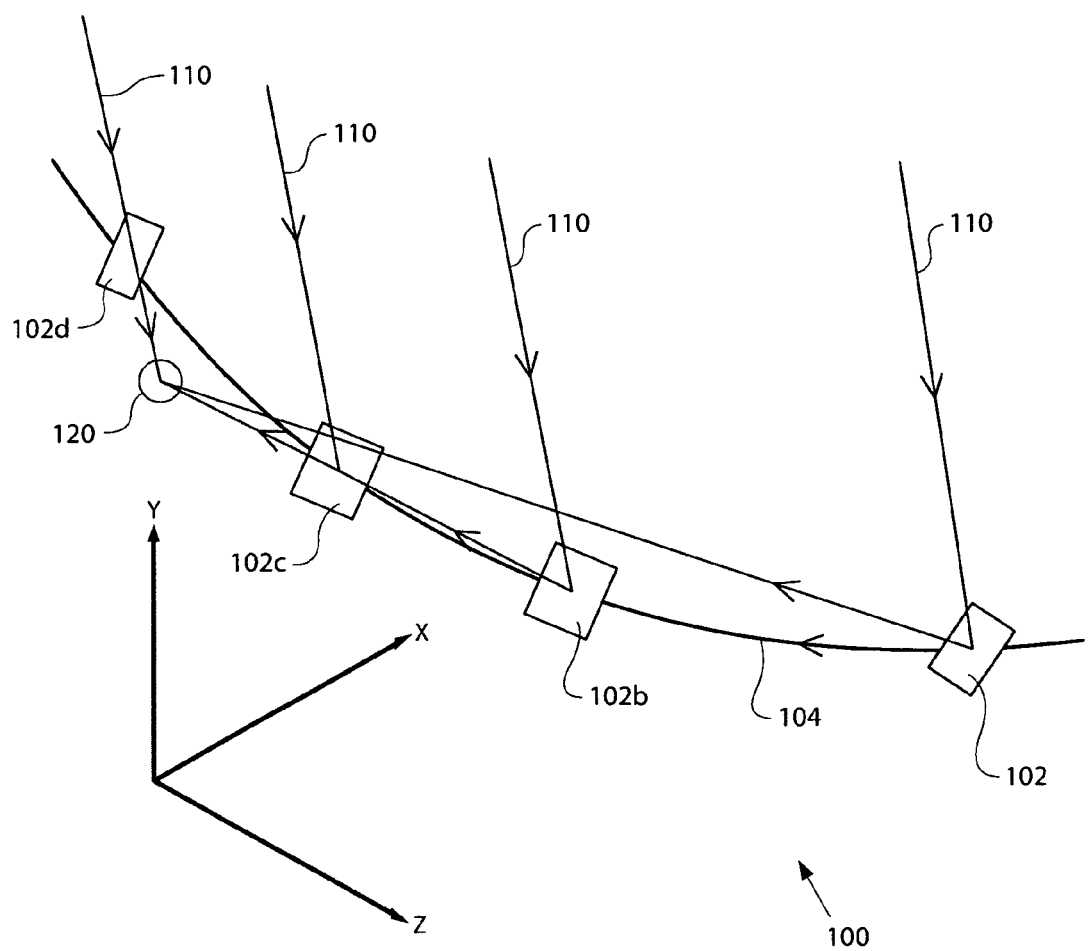
FIG. 1 is a schematical perspective view of one embodiment of a concentrator system of the present invention, shown a mirror that is rotationally fixed as it travels along a path, and a focus, and with elements removed for clarity.

While this invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

Solar Tracking System Overview

Figure 2:
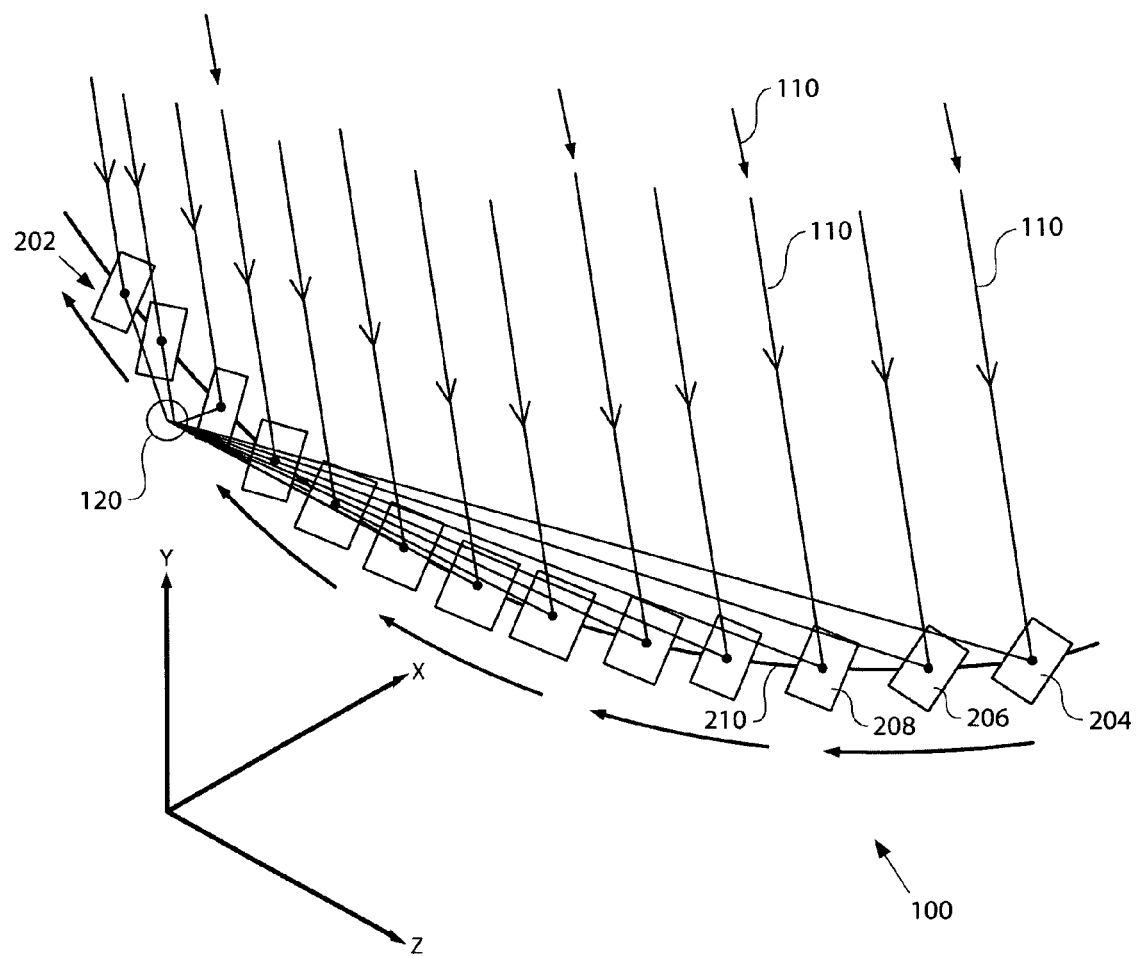
FIG. 2 is a schematical perspective view of one embodiment of a concentrator system showing a mirror family that curves toward the target.

The solar tracking system 100 provides a system and method for focusing light 110 from a moving light source—such as the Sun—to a stationary focus point using a discrete planar mirror array or mirror family 202 as shown in FIG. 2. In one embodiment, the mirror family 202 and the mirror path reside in a single horizontal plane. A mirror with a given orientation, which includes tilt and rotation, will reflect source light to the focus at one instant in time. If the mirror is left stationary, the reflected beam will fall off the focus or target area or target location 120 as the source moves. In existing planar array tracking systems, the mirror orientation is adjusted by continuously altering its tilt and rotation (altitude and azimuth) throughout the day or tracking period.

In the present system 100, the tilt and rotation of the mirror 102 are kept fixed, and the mirror 102 is moved to a new location, where the reflected beam is again incident on the focus or target 120. FIG. 1 shows a single mirror 102 at different locations based on the time of day so that the mirror continuously focuses the light 110 on the target 120. The mirror at location 102 is start position for the beginning of the tracking period, and the mirror at position 102b represents the mirror 102 at a later time during the tracking period that places the mirror 102 in the proper position 102b to focus the light on the target at that later time. Similarly 102c and 102d represent the location of the mirror at progressively later times. The mirror travels along a defined path 104 maintaining the light 110 focused on the target 120.

When the system 100 comprises a mirror family 202, as shown in FIG. 2, the space vacated by moving the mirror 208 is then occupied by a new mirror 206, with a different tilt and rotation optimized for the previous mirror location and new source location. This creates a train of mirrors, all moving along the same and common path 210 on the ground plane. All the mirrors 208, 206, 204 of a mirror family 202 have identical declination angle, however each mirror of a mirror family has a different hour angle value from the other mirrors of the mirror family. The mirrors of a mirror family all move along a common path or track throughout the day during a tracking period to continuously reflect the Sun from each mirror onto the focus without having to alter tilt and rotation.

Each mirror carrier 902 is constructed to support a light path-altering device, such as a planar mirror, a curved mirror, a Fresnel reflector or lens, or a transmissive lens to achieve specific celestial mounting parameters (hour angle and declination angles). The hour and declination angles might both be designed to be fixed, or the declination may be designed to allow seasonal adjustment (rotatable in declination). Seasonal adjustment is explained below. As each mirror is mounted to its carrier, its normal vector is calibrated within the celestial angle constraints of hour angle and declination as located on the celestial sphere by certain mathematical relations.

Solar Tracking

Sun tracking can be realized by translating mirrors within defined paths because the mirror orientation can be represented in terms of celestial coordinates, such as astronomical hour angle and declination angle on the celestial sphere. The celestial coordinate system is used in astronomical positioning where orthogonal angular coordinates represent the position of a celestial object on the celestial sphere in the sky. Once fixed in place, the mirror normal vector will point to a spot on the celestial sphere and will thus have specific hour angle and declination parameters. If the mirror angular orientation is kept constant, that is the mirror is not allowed to rotate or tilt, the mirror normal will always point to the same celestial coordinates, regardless of where the mirror is placed in local three-dimensional space. If the Sun is present in the sky, the mirror will reflect the image of the Sun to a point on the celestial sphere such that the mirror normal coordinates exactly bisect the line (arc) on the celestial sphere between the Sun's coordinates and the Sun's image coordinates. If the focus or target is placed in a nearby terrestrial location, such as on a nearby tower, to intercept the reflected Sun image, then the target is coincident with the reflected image (from the mirror's perspective) and will thus have celestial coordinates identical to the Sun image coordinates, as determined from the mirror's location.

As the Earth turns, the Sun will change hour angle position causing the reflected image coordinates to change, because the mirror normal coordinates are fixed and thus the same as before the Sun moved. If the mirror is kept stationary, the focus must be moved to the new Sun's image celestial coordinates, as determined from the mirror's location. Thus the focus, from the perspective of the mirror, will have new celestial coordinates, which terrestrially and from the mirror's location, will make the focus look higher or lower in the sky, and shifted to the left or right in the sky relative to the original focus position.

It is desired that the focus, rather than the mirror, remain stationary. A new mirror location is calculated using the altitude and azimuth of the new focus location on the celestial sphere as seen from the mirror. The altitude and azimuth can be calculated from celestial coordinates using astronomical positioning mathematics, some of which are described below. The celestial coordinates of the focus are converted to altitude and azimuth relative to the mirror. Then, knowing the height of the focus above the horizontal plane in which the mirror resides, the distance from the mirror to the focus is calculated as R=(focus height)/tan(altitude), and the mirror's new Cartesian coordinates (z, x, y) on the Earth's surface are x=R*sin(azimuth) and z=R*cos(azimuth), relative to the origin (0, 0, 0) where the plus-x axis points due north, the plus-z axis points due east, and the focus location is on the plus-y axis which points at the zenith.

In one embodiment of the system 100, the mirror(s) is/are translated within the horizontal, or y=0 plane. In fact, many different paths in three-dimensional space might be chosen to achieve tracking where the mirror will ride on a path above or below the y=0 plane. In any of these paths, the mirror is not allowed to rotate or tilt, in order to retain fixed hour angle and declination angle parameters. One embodiment of the invention provides operation in the y=0 plane, however, other y≠0 paths could be chosen which are also effective in achieving tracking performance according to the present invention.

Celestial Coordinates in a Tracking Design

Figure 3A:
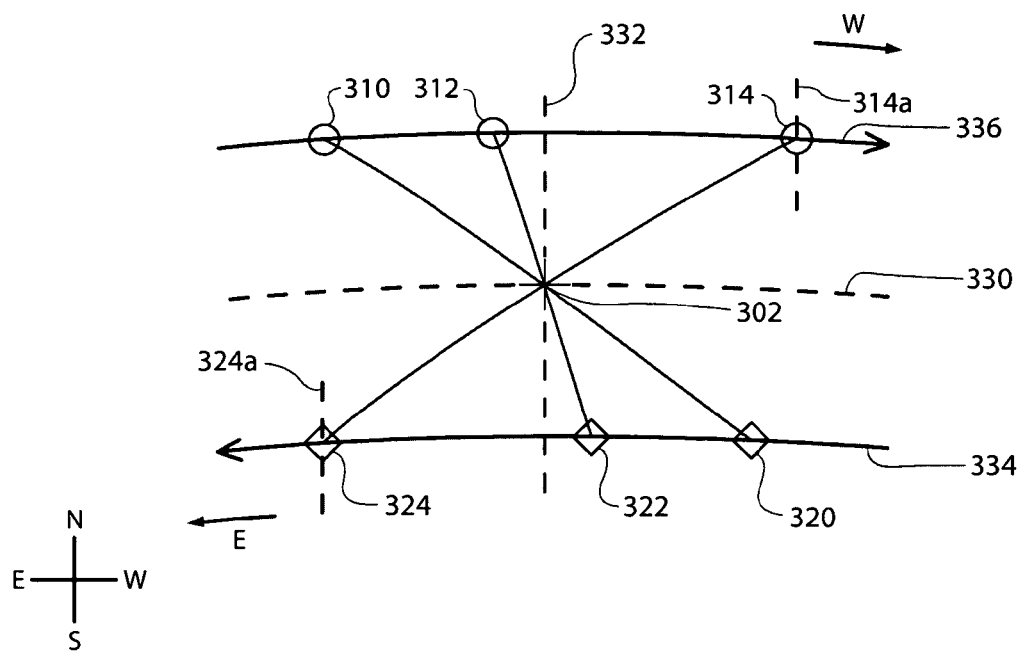
FIG. 3A is a schematical view of the celestial location of a mirror normal vector of a mirror of the concentrator showing a Sun declination line and a target declination line when the Sun declination line is north of the mirror normal coordinates.
Figure 3B:
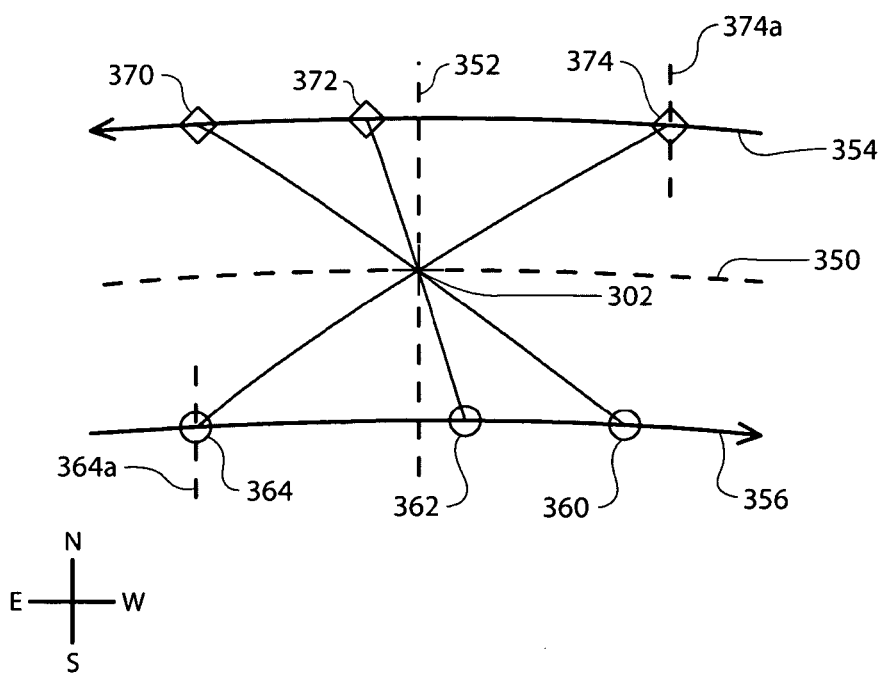
FIG. 3B is a schematical view of the celestial location of a mirror normal vector of a mirror of the concentrator showing a Sun declination line and a target declination line when the Sun declination line is south of the mirror normal coordinates.

As shown in FIGS. 3A and 3B, the Sun, 310, 312, 314, 360, 362, 364 traverses the sky on a specific line of declination being a Sun declination line 336, 356, on the celestial sphere on a given day. Similarly, the focus or target 320, 322, 324, 370, 372, 374 traverses the sky—as viewed from the terrestrial location of mirror with normal celestial coordinate location 302—on a specific line of declination being a target declination line 334, 354 determined by the location of the Sun and the mirror with celestial coordinates at location 302. The mirror normal declination angle is a single and stationary point on a declination line—a mirror normal declination line 330, 350—on the celestial sphere. The mirror normal hour angle is a single and stationary point on an hour angle line—a mirror normal hour angle line 332, 352—on the celestial sphere. The compass keys for FIGS. 3A and 3B are oriented for latitudes in the northern hemisphere. For southern hemisphere latitudes, the compass North and South references would be reversed, with South directed toward the top of the page and North directed toward the bottom of the page. The positioning mathematics utilized in this invention applies to both northern and southern hemisphere latitudes.

Since the mirror normal celestial coordinates are constant, symmetry is created between the celestial locations of the Sun, the mirror normal, and the Sun's image or target location. A mirror normal can be understood as the vector pointing away from the mirror plane center in the general direction of the light source and perpendicular to the reflective plane of the mirror. FIG. 3A shows the Sun declination line and the target declination line when the Sun declination line is north of the mirror normal celestial coordinates 302. As shown in FIG. 3A, the symmetry forces the celestial location of the target 320, 322, 324, as viewed from the mirror and coincident with the Sun's image, to travel on the target declination line 334 which is offset south from the mirror normal declination line 330 the same angular distance as the Sun declination line 336 is north from the mirror normal declination line 330, with the mirror normal declination line 330 in between the Sun declination line 336 and the target declination line 334. FIG. 3B shows the Sun declination line and the target declination line when the Sun declination line is south of the mirror normal celestial coordinates 302. As shown in FIG. 3B, this symmetry forces the celestial location of the target 370, 372, 374, as viewed from the mirror and coincident with the Sun's image, to travel on the target declination line 354 which is offset north from the mirror normal declination line 350 the same angular distance as the Sun declination line 356 is south from the mirror normal declination line 350, with the mirror normal declination line 350 in between the Sun declination line 356 and the target declination line 354.

Similarly, the hour angle line of the target east or west of the mirror normal hour angle line 332, 352 will be a magnitude equal to the hour angle of the Sun west or east of the mirror normal hour angle line 332, 352, again with the mirror normal hour angle in between the Sun and the Focus. As shown in FIG. 3A the target hour angle line 324a is east of the mirror normal hour angle line 332 a magnitude equal to the Sun hour angle 314a is west of the mirror normal hour angle line 332. Similarly, as shown in FIG. 3B the target hour angle line 374a is west of the mirror normal hour angle line 352 a magnitude equal to the Sun hour angle 364a is east of the mirror normal hour angle line 352. Thus, as viewed from the mirror during the tracking period, the focus will rise, peak and set on a line of declination opposite to the Sun across the mirror normal and in the opposite direction as the Sun. As viewed from the mirror, the focus location rises in the west and sets in the east on line of declination symmetrically displaced across the mirror normal declination line from the Sun's declination line. In the system 100, the mirror moves relative to the focus or target so that the apparent position of the focus on the celestial sphere follows the description above.

Mirror Families

Figure 5:
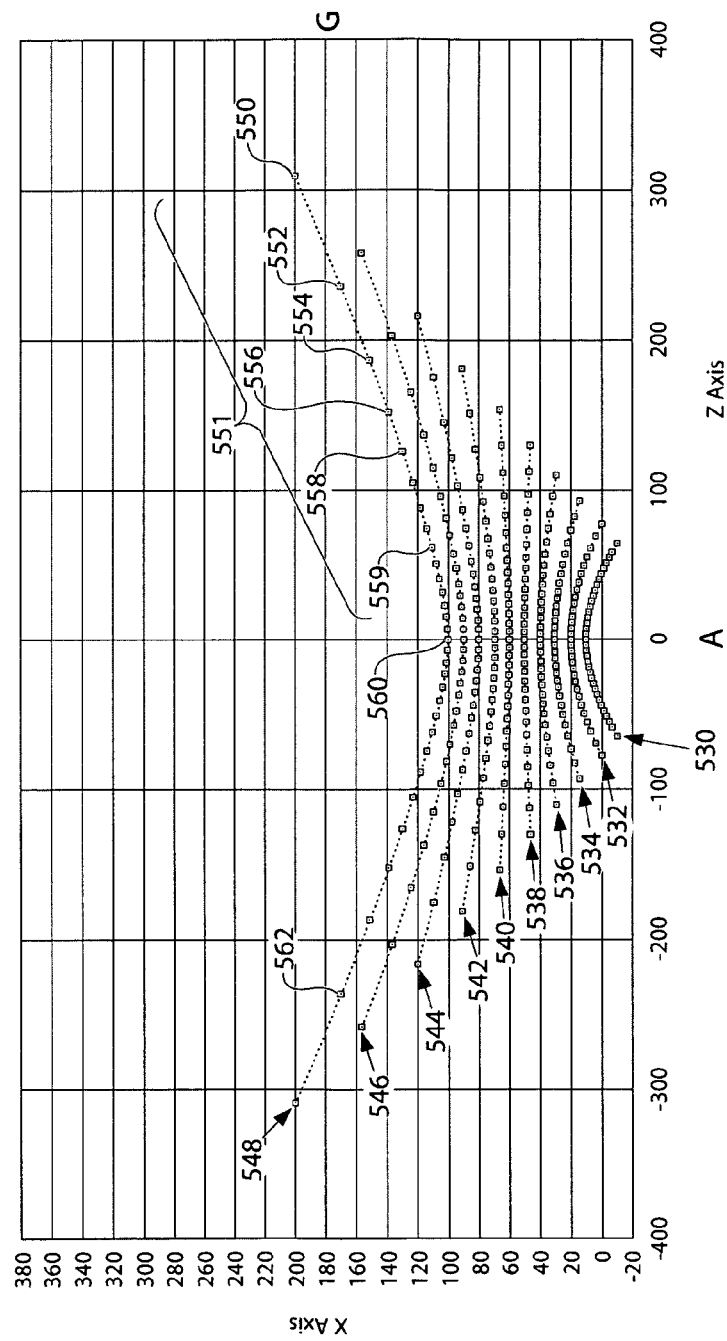
FIG. 5 is a graphical representation shown down from the y-axis or down from the zenith of a plurality of paths and mirror families.
Figure 6:
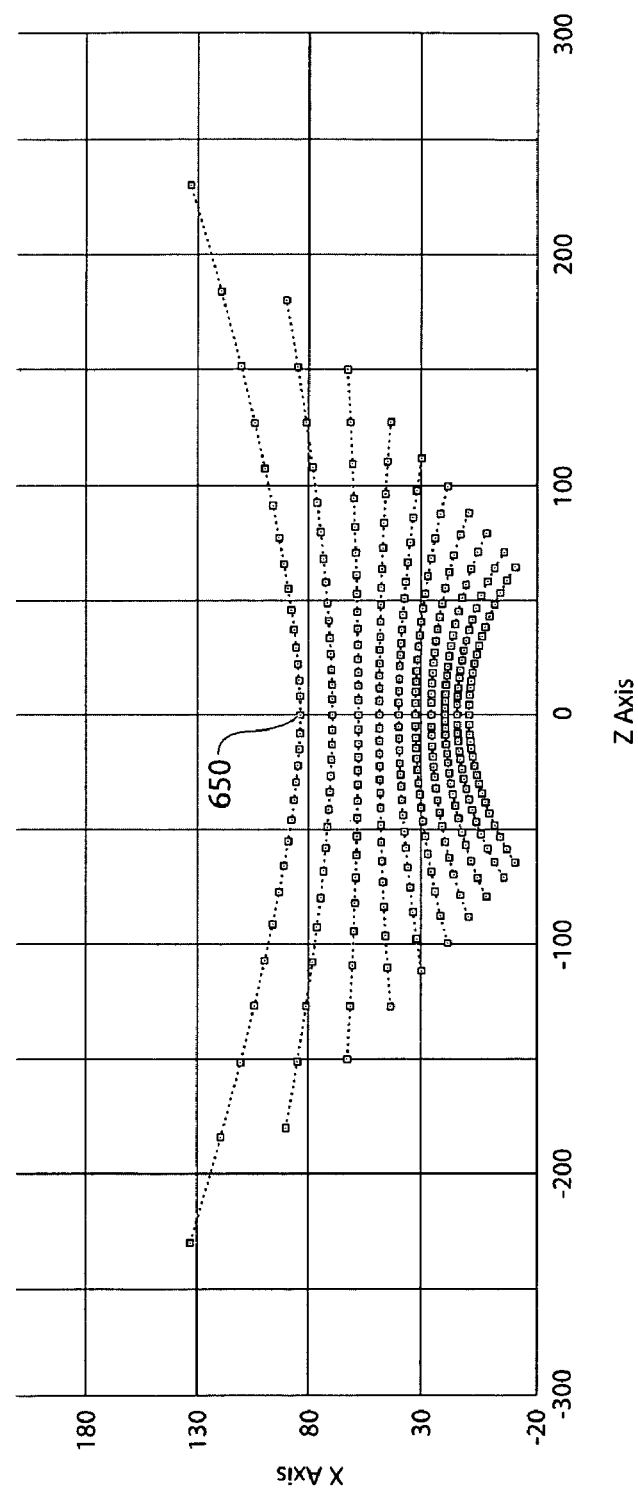
FIG. 6 is a graphical representation shown down from the y-axis or down from the zenith of a plurality of paths and mirror families.

FIG. 5 and FIG. 6. show a top schematical view from the zenith view or from the y axis of several mirror families 530, 532, 534, 536, 538, 540, 542, 544, 546, and 548. The scale on the X and Z axes are not limited to any particular unit of measure and may represent any linear unit of measure, such as inches, feet, miles, centimeters, meters, or kilometers. All figures use a three-dimensional space coordinate system where the x and z axis define horizontal coordinates and the y axis defines a vertical direction toward the zenith. The +x direction is due north, +z direction is due east, and the +y direction is toward the zenith. Zenith is the direction pointing directly above a particular location.

With the Sun at noontime (hour angle is $\tau=0°$) altitude for a particular day of the year, parameters (z, x) for a mirror are chosen which, when implemented, will cause it to reflect the image of the Sun to a chosen focus point at local noon. This location is the root, or reference location for all other mirrors in the family, and will have specific hour angle ($\tau$) and declination ($\delta$) angles associated with it. This root mirror calculation defines the declination angle for all mirrors in the family. A mirror family may be of a quantity of 2n+1 mirrors. For example, mirror family 548 of FIG. 5 has 31 mirrors where n=15.

Celestial coordinates can be converted to altazimuthal coordinates with the formulas: $\sin(a)=\sin(\delta)\sin(\phi)+\cos(\delta)\cos(\phi)\cos(\tau)$; If $\tau>0$, $\cos(\pi-A)=\{\sin(\delta)-\sin(\phi)\sin(a)\}/\cos(\phi)\cos(a)$; If $\tau<0$, $\cos(\pi+A)=\{\sin(\delta)-\sin(\phi)\sin(a)\}/\cos(\phi)\cos(a)$. Altazimuthal coordinates can be converted to celestial coordinates with the following formulas: $\sin(\delta)=\sin(a)\sin(\phi)+\cos(a)\cos(\phi)\cos(A+\pi)$; $\sin(\tau)=-\sin(A+\pi)\cos(a)/\cos(\delta)$. While these formulas may be used to convert between celestial coordinates to altazimuthal coordinates, other methods and formulas may also be used that affect the same result of conversion. Generally, "$\tau$" represents the hour angle relative to local noon ($\tau=0$ at local noon); "$\delta$" represents declination; "$\phi$" represents latitude; "A" represents azimuth relative to due south; and "a" represents altitude angle above the horizon. Altitude angle is zero degrees when an object is at the horizon, and 90 degrees when an object is at the zenith.

Positioning Mirrors of a Mirror Family

All the mirrors of the family simultaneously focus and reflect sunlight to the target. This mirror family is created by defining a mirror coordinate group ($z_a$, $x_a$, y, $\tau_a$, $\delta_a$). There $z_a$, $x_a$, 0 represent the Cartesian coordinates of the mirror in the z-x plane (that is, the mirror's position relative to the focus axis in the z-x plane), y is the focus height and has a single value chosen for the design, $\tau_a$ represents the incremental value of hour angle associated with a particular mirror and $\delta_a$ represents the common declination angle of the mirror normal vector for all mirrors in the family.

To create a mirror family—with a chosen focus position (0, 0, y) above the mirror z-x plane—choose a starting position ($z_0$, $x_0$, 0) of a root mirror and calculate—for noontime Sun altitude ($\tau=0°$) on a given day of the year—the mirror normal vector hour angle and declination required to direct the Sun's image onto the focus. This root mirror 560 of a declination family, for example in declination mirror family 548, has coordinates ($z_0$, $x_0$, 0, $\tau_0$, $\delta_0$). While mirror 560 is chosen here as the root mirror, any other location on the Z-X plane may instead be chosen as the location of the root mirror.

To determine the declination for a mirror family with focus location (0, 0, y) and Cartesian location (z, x, 0) for root mirror, calculate focus altitude relative to mirror location with this formula: $\tan(a_f)=y/\{(z^2+x^2)^{1/2}\}$; $\tan(A_f)=z/x$. Where subscript "f" denotes focus. Convert focus or target altazimuthal coordinates to celestial coordinates $\tau_f$ and $\delta_f$ using conversion equations, such as those provided above.

Using Sun $\tau_s=0$ and declination=$\delta_s$, calculate mirror hour angle and declination for root mirror as $\tau_m=\tau_f/2$ and $\delta_m=(\delta_s+\delta_f)/2$. $\delta_m$ is the declination value for all mirrors in this family. The system accounts for the seasonally varying nature of the Sun's declinational value, as explained below.

Next, calculate the location ($z_{-1}$, $x_{-1}$, 0) where the root mirror will be located, when the Sun is at a chosen number of degrees, $\tau_i$, earlier in hour angle than $\tau=0$, or at $\tau_s=-1*\tau_i$. To determine a new mirror location with a new Sun hour angle, calculate new focus hour angle and focus declination using these formulas $\tau_f=\tau_m-(\tau_s-\tau_m)$ and $\delta_f=\delta_m-(\delta_s-\delta_m)$. Convert focus celestial angles to altazimuthal angles (altitude=a; azimuth=A) using the conversion equations defined above. Calculate new mirror coordinates using R=y/tan(a) and, $x_m=R\sin(A)$ and $z_m=R\cos(A)$. The mirror's coordinates are now ($z_{-1}$, $x_{-1}$, 0, $\tau_0$, $\delta_0$). Repeat this process for $\tau_s=-2\tau_i$ value of Sun hour angle, creating coordinates for unique mirror location ($z_{-2}$, $x_{-2}$, 0, $\tau_0$, $\delta_0$). Repeat this process for incrementally larger factors of $\tau_i$, ending with $-n\tau_i$, and location reference ($z_{-n}$, $x_{-n}$, 0, $\tau_0$, $\delta_0$).

Calculate the (z, x) location of where the root mirror must be located at the number of degrees, $\tau_i$, later in Sun hour angle $\tau_s=\tau_i$. This location has coordinates ($z_1$, $x_1$, 0, $\tau_0$, $\delta_0$) Repeat this process for $\tau=+2\tau_i$ value of Sun altitude and azimuth, creating reference mirror coordinates ($z_2$, $x_2$, 0, $\tau_0$, $\delta_0$). Repeat for incrementally larger factors of $\tau_i$, ending with $\tau_s=+n\tau_i$ and location mirror coordinates ($z_n$, $x_n$, 0, $\tau_0$, $\delta_0$). The mirror locations at the beginning and end of a tracking period will thus be ($z_{-n}$, $x_{-n}$, 0, $\tau_0$, $\delta_0$) and ($z_n$, $x_0$, 0, $\tau_0$, $\delta_0$), respectively. The tracking period is the time frame during which the system focuses light on the target. For example, as shown by the mirror families 530-548 in FIG. 5, if Sun tracking is chosen to start at Sun hour angle $\tau_s=-60°$ (4 hours before noon), incremental $\tau_i$ might be chosen to be 4° (16 minutes) and n is thus 60/4=15.

Calculate, for the location $z_{-1}$, $x_{-1}$, 0, the hour angle $\tau_{-1}$ for a new mirror required at local noon. This new mirror will thus have coordinates ($z_1$, $x_1$, 0, $\tau_1$, $\delta_0$). Then using the same process as above, calculate mirror coordinates out to $\tau_s=+/-n\tau_i$. The mirror locations at the beginning and end of the tracking period will thus be ($z_{-1-n}$, $x_{-1-n}$, 0, $\tau_{-1}$, $\delta_0$) and ($z_{-1+n}$, $x_{-1+n}$, 0, $\tau_{-1}$, $\delta_0$), respectively. Similarly calculate, for location $z_2$, $x_2$, 0, new mirror hour angle $\tau_2$ required at local noon, which will have coordinates ($z_{-2}$, $x_{-2}$, 0, $\tau_{-2}$, $\delta_0$). Then using the same process as above, mirror coordinates are calculated out to $+/-n\tau_i$ so that the coordinates of the end locations are ($z_{-2-n}$, $x_{-2-n}$, 0, $\tau_{-2}$, $\delta_0$) and ($z_{-2+n}$, $x_{-2+n}$, 0, $\tau_{-2}$, $\delta_0$). Repeat above process for all mirrors and locations out to $z_{+/-n}$, $x_{+/-n}$, 0. The mirrors at the trailing end of the train will thus traverse locations ($z_{-2n}$, $x_{-2n}$, 0, $\tau_{-n}$, $\delta_0$) through ($z_0$, $x_0$, 0, $\tau_{-n}$, $\epsilon_0$) and the mirror at the leading edge of the train will traverse ($z_0$, $x_0$, 0, $\tau_n$, $\delta_0$) through ($z_{2n}$, $x_{2n}$, 0, $\tau_n$, $\delta_0$) during the span of Sun hour angle $-n\tau_i$ to $+n\tau_i$. The mirror family with common declination angle $\delta_0$ is now defined with 2n+1 mirrors, each with unique hour angle, with dynamic spacing relative to its neighbors and all following the same track sequentially as shown in FIG. 5 and FIG. 6.

In the early hours of a day the spacing of trailing mirrors of a mirror family may be compressed relative to each other and thus not focused on the target to save space at a system edge. As the mirror family advances to track the Sun's movement, these trailing mirrors will move into position to focus sunlight on the target. Similarly, in the later hours of a day the spacing of leading mirrors of a mirror family may compress and not be focused on the target to save space an opposite system edge. The system may provide a mechanism for compressing and uncompressing trailing and leading mirrors' spacing of a mirror family.

Multiple Mirror Families

Multiple families, as shown in FIG. 5 and FIG. 6, may be created by utilizing the above procedure with multiple, non-overlapping (z, x) starting locations. FIGS. 5 and 6 show several families of mirrors operating side by side and simultaneously, allowing increased light concentration on the focus or target 120. A new root mirror location ($z_0$, $x_0+x_i$, 0) is chosen considering optimization of mirror packing within the system. Optimization of mirror packing occurs when the total available surface of the system, as viewed from the focus, is illuminated continuously throughout the tracking period so that no dark gaps in the system exist due to mirror spacing. Location $x_i$ is an offset value from $x_0$ and may be positive or negative. Using this new location, a new declination angle, $\delta_1$, is created for a new mirror family. The same design process as described above is then implemented to create a second mirror family and associated mirror locations during the tracking period associated with the Sun hour angle traversal of the path $-n\tau_i$ to $+n\tau_i$. Additional mirror families may be created to scale the system 100 to create as many mirror families as required to cover a particular area or concentrate a particular amount of light on the target. Each mirror family has a unique declination angle which is common to all mirrors in the family.

Calibration of Individual Mirror Declination (δ) and Hour Angle (τ)

In one embodiment, the mirror elements used in the tracking system contain no moving parts and no fulcrum and lever arm components. The mirror orientation is fixed according the process provided.

To establish the correct declination (δ) and hour angle (τ) parameters for a mirror, an operational surface that may support or comprise a mirror, is created or provided so as to set the declination (δ) and hour angle (τ) attributes for the mirror element being designed. The operational surface may be created through conventional means, such as plastic molding, milling, or frame construction. The operational surface has its normal vector directed at the mirror's design declination (δ) and hour angle (τ). If the operational surface is comprised of a metallic and reflective material, the operational surface might then be polished and if the operational surface is manufactured to adequate precision, no further angle calibration is required. Alternatively, a reflective element (a simple plane mirror or a curved mirror) may be mounted to the operational surface by conventional connective means, such as adhesive, clamps, or fixing screws. In one embodiment, considering manufacturing cost and component cost, it may be desirable to utilize a operational surface manufactured with a lower precision and implement a fine-tuning calibration procedure to bring the surface into the correct declination (δ) and hour angle (τ) parameters according to the required precision before permanent affixing of the mirror to the operational surface.

Figure 7:
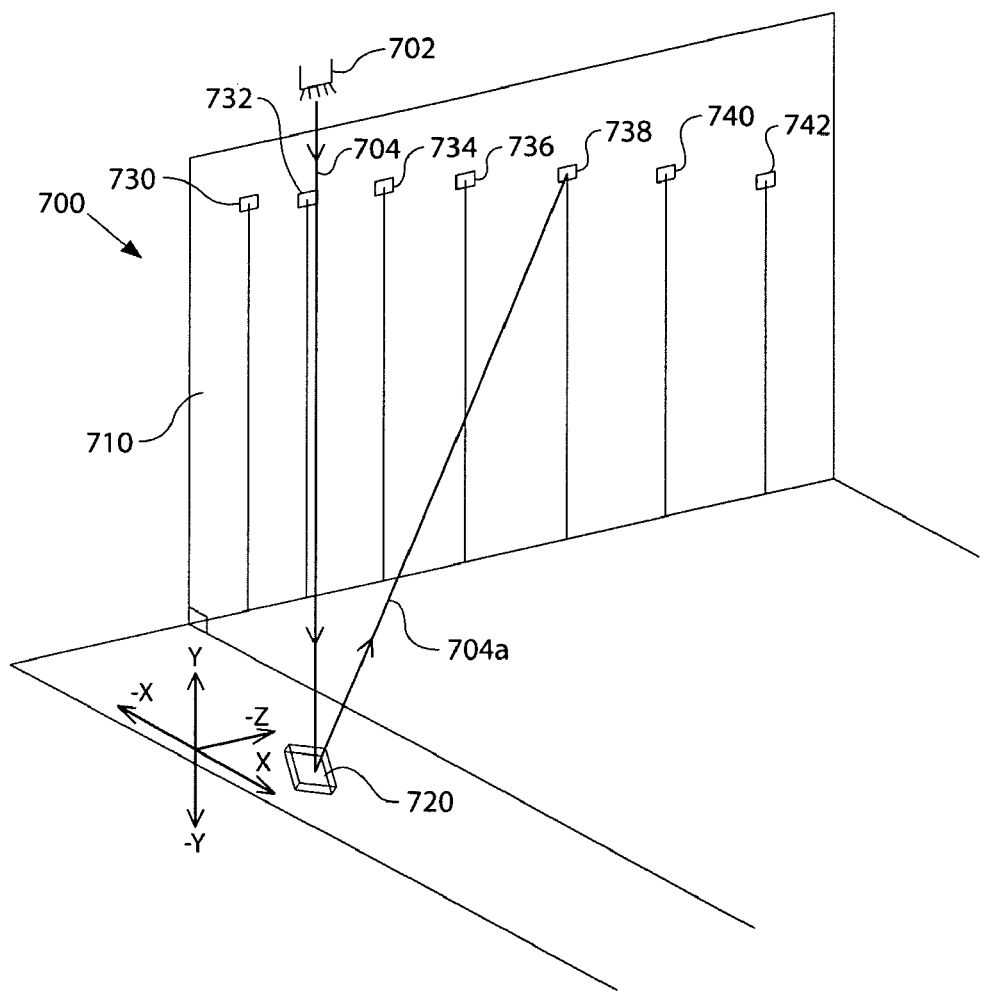
FIG. 7 is a perspective view of a calibration system of the present invention.

The mathematical derivations and equations for correlating and calibrating location, declination (δ) and hour angle (τ) can be utilized in creating a calibrating tool for calibrating individual mirrors to their exact δ and τ design values. Referring to FIG. 7, the equations provided above for calculating (z, x) location given declination (δ) and hour angle (τ) and Sun position can be used to calculate where the reflected image of a laser or other light source 702 will fall on a screen 710 of a laser calibration system 700. From this relationship, a projection tool is created which utilizes a laser 702 to provide a single incident ray 704 for the purpose of calibrating the geometry including the declination (δ) and hour angle (τ) of each mirror 720 relative to its carrier 902. The image of the reflection 704a of the vertical light beam 704 from a particular mirror 720 with specific declination (δ) and hour angle (τ) requirements can be calculated using the equations above, and this reflection location 730, 732, 734, 736, 738, 740, and 742 marked as a target on a nearby screen 710. The mirror 720 is placed into the path of the vertical laser beam 704, and the mirror's declination (δ) and hour angle (τ) is fine tuned so that the reflection of the laser beam 704a is incident on the target spot 738 on the screen 710.

The laser 702 projects its beam vertically downward, i.e. in the minus-y direction. A location 738 where the resultant reflected laser beam 704a appears on the screen 710 can be calculated, and a target spot labeled 738 on the screen, given (1) a predefined orientation of the laser beam, (2) the z-x location of the ray on the horizontal plane of the system, (3) the desired declination (δ) and hour angle (τ) for a given mirror, and (4) the location of a perpendicularly-oriented planar screen. The target spot locations 730, 732, 734, 736, 738, 740, and 742 on the screen for each mirror of common declination (δ) and unique hour angle (τ) is determined and added to the screen, creating a template for a mirror family. Each target spot locations 730, 732, 734, 736, 738, 740, and 742 corresponds to the common declination (δ) and unique hour angle (τ) of each mirror within a mirror family. The calibration accuracy is set by the diameter of the target spot and the distance between the screen and the mirror under calibration.

The mirror carrier location in the calibration structure is fixed relative to the laser. Thus, individual mirror carriers are successively placed onto a common landing location on the structure. The landing location orients each mirror carrier so that its perimeter correlates to the Cartesian coordinates of the tracking system. The landing location provides an orienting function so that the base of each mirror has the same angular relationship to the laser 702 and the target as every other mirror in a mirror family. When in place on the landing location, the mirror is physically adjusted relative to the operational surface of the mirror carrier so that the laser reflection coincides with the design target on the screen. Once oriented, the mirror is then anchored to the mirror carrier in place with any number of affixing mechanisms, such as adhesive, or clamps. Alternatively, this laser calibration system 700 can be used as a quality control tool for assuring the correct angles are set when using a high precision prism (i.e. no calibration required).

Seasonal Variation

The seasonal variation of the location of the Sun in the sky may be accounted for in a Sun tracking system. The altitude of the Sun above the horizon at noon varies sinusoidally with a period of one year and amplitude of 23.5°. The Sun's noontime altitude variation may be calculated as (90°–local latitude)+/−23.5°. This seasonal noontime altitude is maximal in northern hemisphere summers and minimal in northern hemisphere winters, and as the year progresses, the mirror system must account for this seasonal variation. The seasonal noontime altitude variation of the Sun may be accounted for by altering the tilt and rotation of individual mirrors to maintain focus on the target. The seasonal adjustment can either be calculated and applied via a calendar and computer control, or a Sun location sensor can be utilized to sense Sun position and the position may be used by a computer to apply compensatory tilt and rotation adjustments to each mirror to maintain focus on the target.

To maintain focus on the target in the present system 100, a change in the Sun's declination requires a compensating change in either the declination angle of all the individual mirrors in the system, or a change in the path of each train or mirror family while retaining fixed mirror angles. Seasonal variation in the altitude of the Sun or the Sun's declination will change, on average, about 0.25 degrees per day. The variation may be accounted for in several ways. First, by allowing the declination angle of all mirrors in the system to be adjustable by an identical and equal amount that is half the magnitude of the Sun's declination change over the period, or a range of +/−11.75 degrees and the mirror trains can remain on the same track throughout the year. Second, the mirrors in a mirror family having a specific common declination angle can be physically swapped out for those of different declination angles as needed. Third, the train track positions might be altered to adapt to the shape of the declination track or path thus allowing the mirrors to have fixed celestial angles throughout the year. Fourth, the individual trains can be driven onto new and fixed tracks as the year progresses, where the mirror family positioned on the new track would focus light on the target. To change the path of each mirror family, a track switching technique may be utilized such as used in train yard operations, where a mirror train is diverted onto a spur, then backed up onto a new track in an organized fashion.

The frequency of adjustment for Sun declination variation will depend on the requisite focus accuracy of the system, and the adjustment can be automated within the mechanics of the carrier or with track switching techniques. Thus, in one embodiment, the declination axis on a carrier can be designed to remain open as a degree of freedom to adjust for seasonality.

Mirror Track—Curved Track Having Precise Focus

Figure 8:
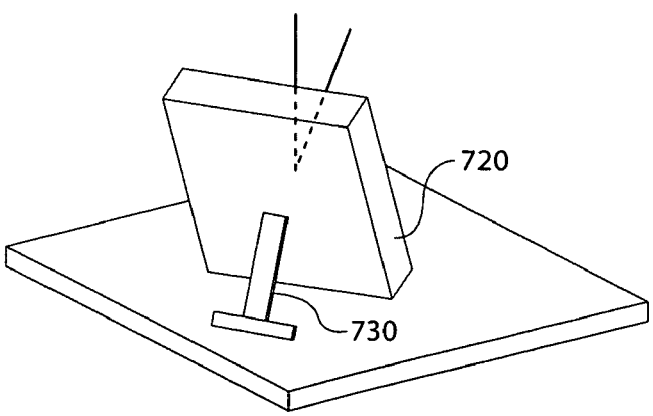
FIG. 8 is an enlarged perspective view of a mirror taken from FIG. 7.

In one embodiment, each mirror in the family utilizes a separate mounting support 730, such as shown schematically in FIG. 8, which fixes declination (δ) and hour angle (τ) but allows translational movement in the x-z plane. The mounting support may be any structure that fixes the declination (δ) and hour angle (τ) of the mirror. The supports for a mirror family may be attached to a carrier. Alternatively, the carrier may comprise multiple independent supports independently moving along a defined path 920 to maintain light focused on the target.

In another embodiment, where the system allows the mirror to have a variable declination (δ) and/or hour angle (τ), the mounting support is configured to allow the mirror to move to adjust the declination (δ) and/or hour angle (τ).

Figure 9:
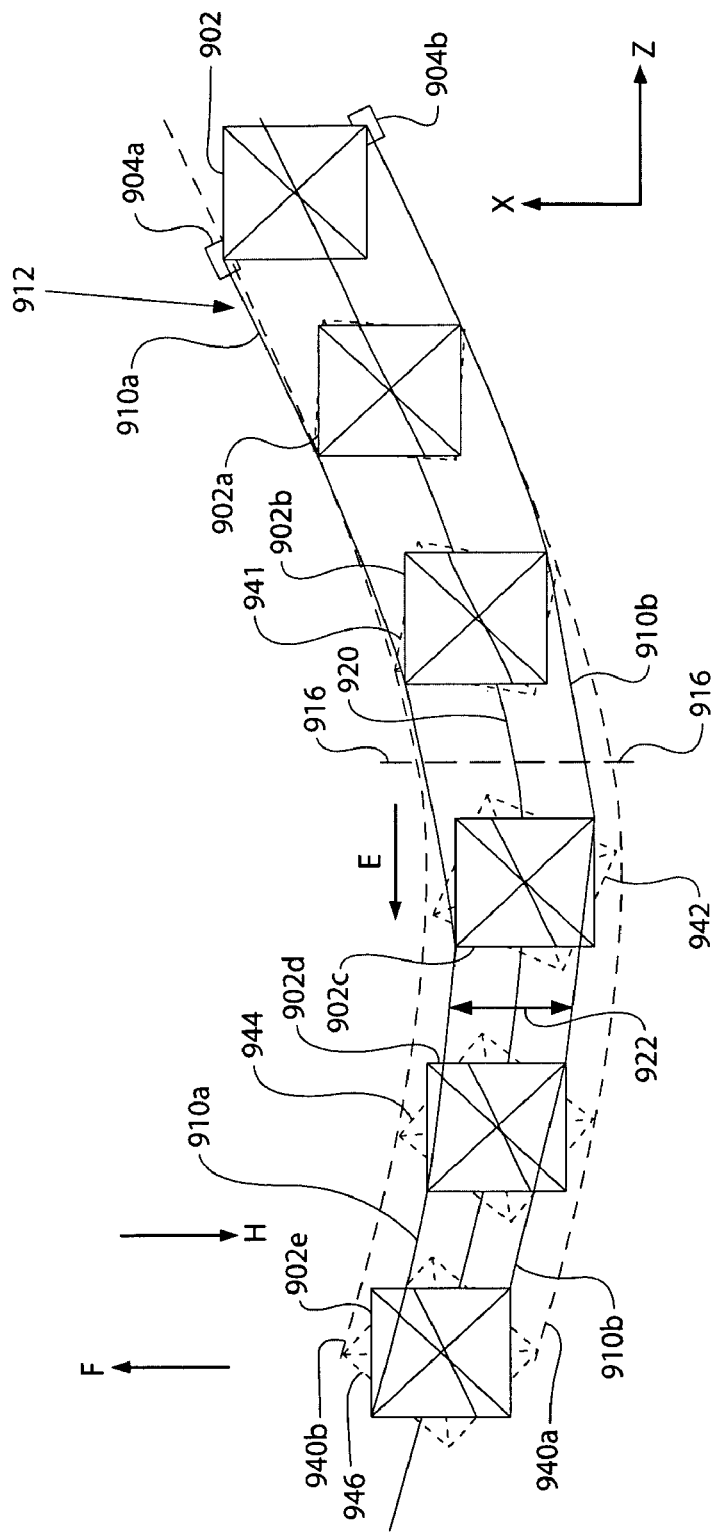
FIG. 9 is a schematical view of a track carrier system of the present invention.
Figure 9A:
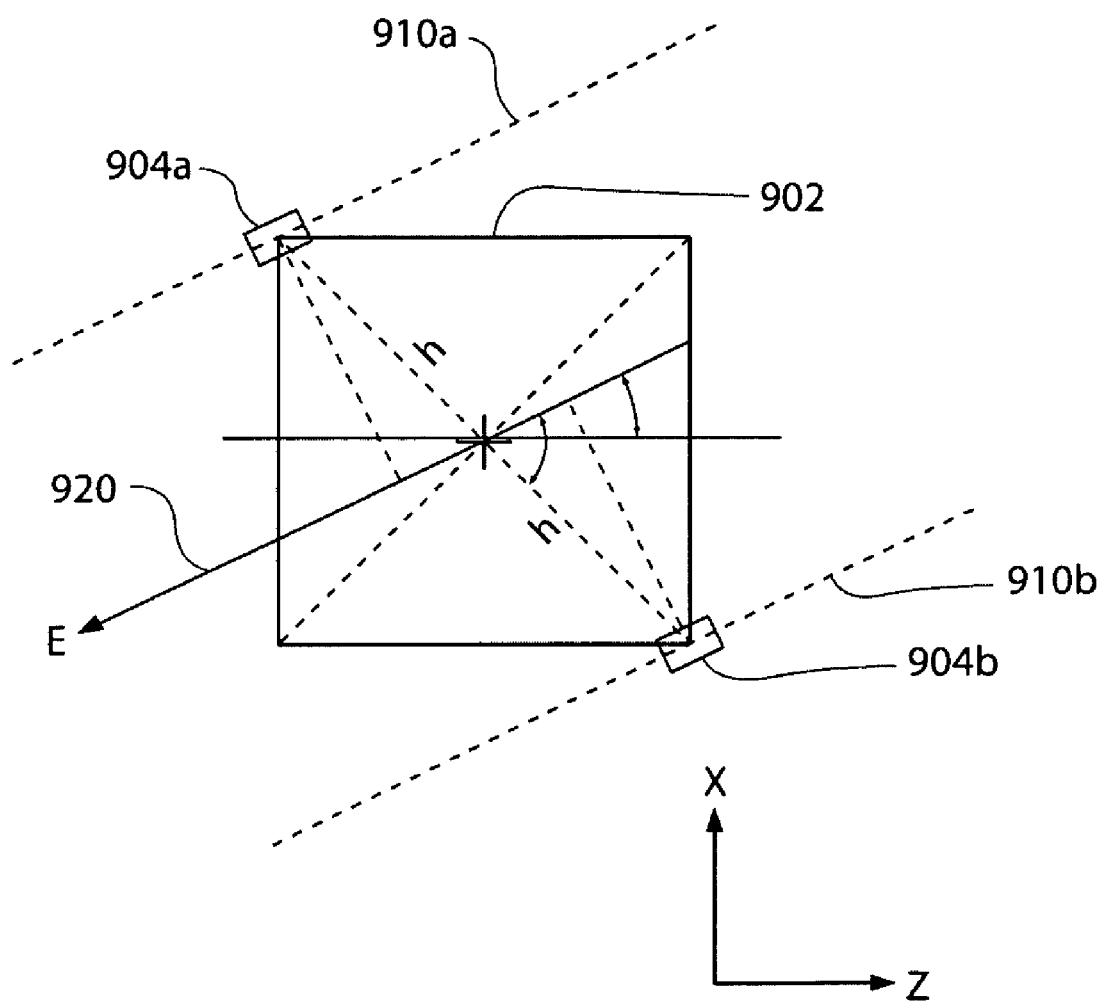
FIG. 9A is an enlarged view of a portion of the track carrier system taken from FIG. 9.

In one embodiment, each individual support is affixed to a carrier 902, as shown schematically in FIG. 9, with wheels 904a, 904b which ride on a two-rail track 910a, 910b that directs the family of mirrors along a defined path 920. FIG. 9 shows the progressing of a carrier 902 in direction E, where each carrier 902, 902a, 902b, 902c, 902d, 902e represent a carrier as it processes to maintain the mirror in a position to focus light on the target. Each mirror carrier 902 in the family follows the same track and at decreasing speed over time when nearing the zenith axis shown as the z-axis zero line or A in FIG. 5. The track will follow the shape of a shallow curve, whose apex occurs when nearest the focus as shown in FIGS. 5 and 6.

In one aspect of the embodiment, the curved path 920 having a decelerating speed tracking system is constructed with individual mirror carriers 902 and the mirrors attached to the carrier that are kept rotationally fixed relative to the y-axis (vertical axis). For example, assume that mirrors 559, 558, 556, 554, 552, 550 represent a mirror train family 551 in FIG. 5. At the beginning of the tracking period (τ<0), represented at the right side of FIG. 5, the distance between mirrors at the trailing edge, near mirror 550, of the train are largest, and they also have a greater velocity when moving toward the zero line of FIG. 5 than mirrors toward the front of the train. The mirrors at the leading edge, such as mirrors 559 and 558, move at a slower rate but also travel on a shallower slope relative to the z-axis when approaching the zero line in FIG. 5. Each mirror carrier 902 has two lateral degrees of freedom to adjust track slope or arc and a speed control to dynamically adjust mirror spacing while keeping δ and τ fixed. While mirrors 559, 558, 556, 554, 552, 550 may represent a mirror train family 551, other subsets of mirrors shown in FIGS. 5 and 6 may also represent a mirror train family.

Figure 4:
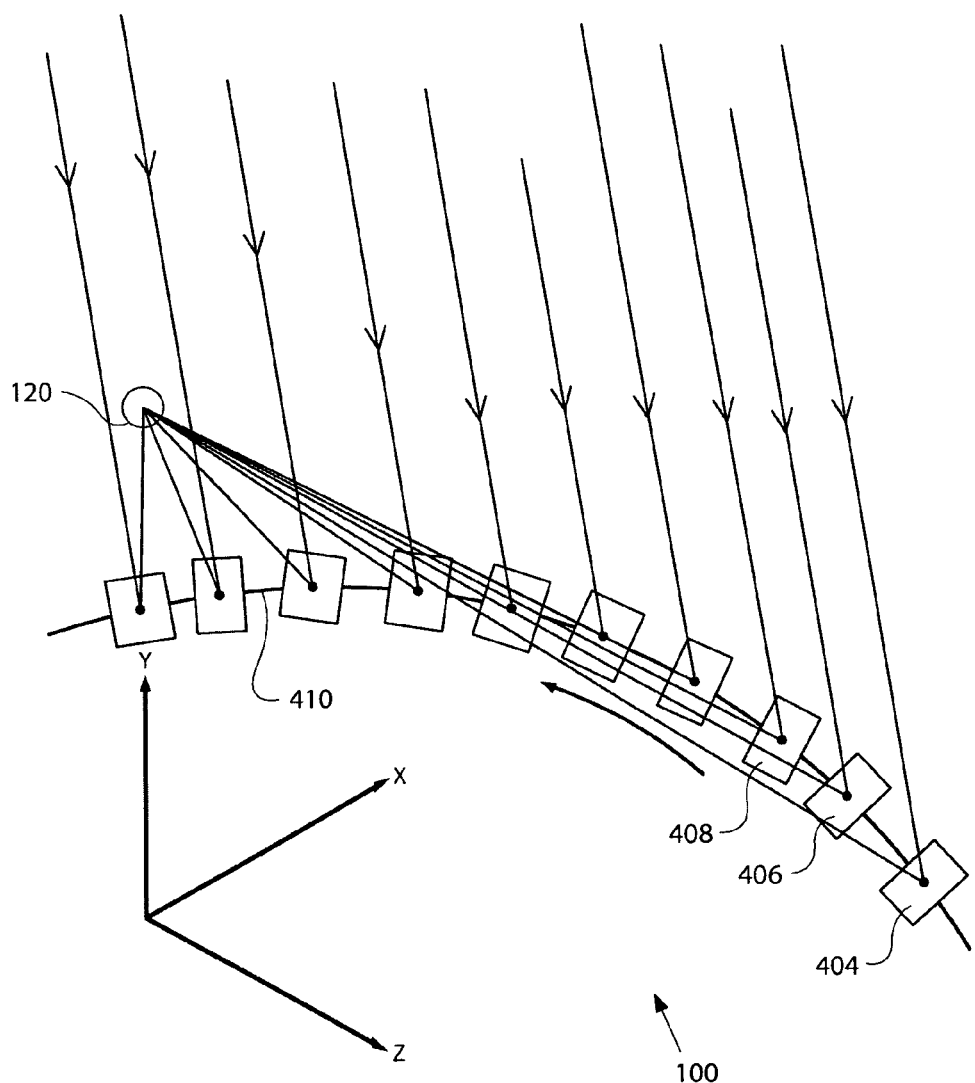
FIG. 4 is a schematical perspective view of one embodiment of a concentrator system showing a mirror family that curves away from the target.
Figure 4A:
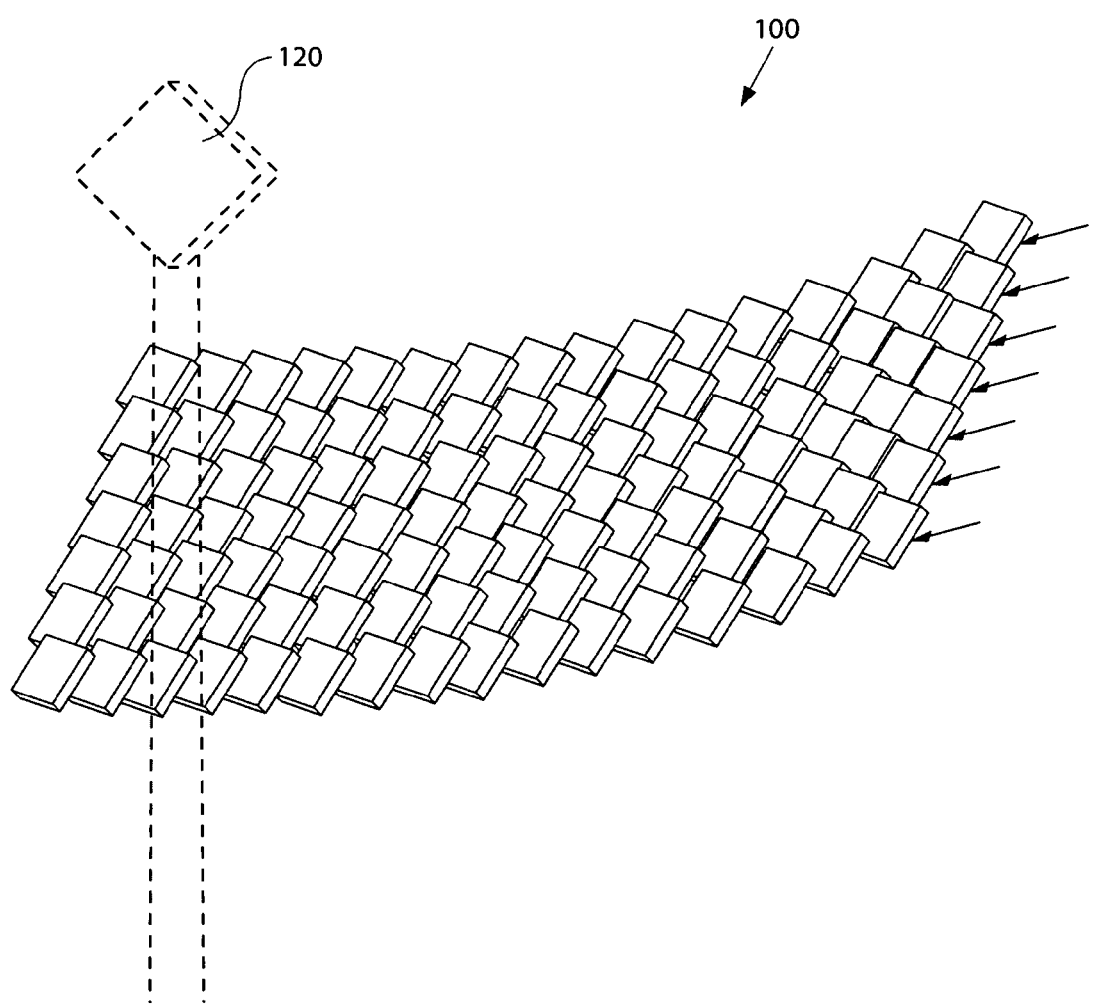
FIG. 4A is a perspective view of several partial mirror families.

FIGS. 2 and 4 show an example of a train of mirrors following the curved track or path 210, 410 according to the above calculations. FIG. 2 shows a mirror family on a path where the ends of the path are farther away on the x axis from the target than the apex of the path at the zenith axis of the target, such as paths 540, 542, 544, 546 and 548 shown in FIG. 5. FIG. 4 shows a mirror family on a path where the ends of the path are closer in the x axis direction from the target than the apex of the path at the zenith axis of the target, such as paths 530, 532, 534, 536 and 538 shown in FIG. 5.

Switchable Track Design for Tracking Sun's Seasonal Declination

In one embodiment, as shown in FIG. 6, the tracks of the system are arranged in a novel relationship to allow path switching or track switching as an adjustment method to account for seasonal variation in the declination of the Sun. Track switching is a desirable method for adjusting for the Sun's declination since it allows the system to be hands-off after initial installation, and allows the retention of the desirable no-rotation feature of the invention.

FIG. 6 represents a design where the x-axis spacing is uniquely determined for track switching declination adjustment and where families switch to adjacent tracks every 5 degrees in seasonal Sun declination change. In contrast, FIG. 5 represents a design with equal spacing between families along the x-axis, and so to adjust for variation in Sun declination, declination adjustment on individual mirrors is required, or swapping out mirror families is required.

The table of FIG. 6A shows a root mirror 650 location is selected, for example, (0, 84). A Sun altitude noontime maximum is selected, calculated by (90−local latitude)+23.5 degrees. In FIG. 6A, the noontime altitude is chosen as 70 degrees, as shown in column E. With the given root location—as shown in column D—and Sun altitude—as shown in column E—the root mirror (0, 84) of column D has a mirror normal declination of 4.88 degrees, as shown in row 661. The location of this root mirror at various Sun noontime altitudes—varying Sun declinations accounting for seasonal variation of the Sun—are calculated, as shown in column D. For example, the root mirror at (0, 84) when the Sun noontime altitude is 70 degrees is moved to and becomes the root mirror at (0, 70.157) when the Sun noontime altitude changes to 65 degrees, and is moved to and becomes the root mirror at (0, 58.885) when the Sun altitude changes to 60 degrees. In column E of FIG. 6A, the Sun noontime altitude is varied in 5 degree increments.

The table of FIG. 6A, created by the above process, contains in columns A-D and rows 651-660 the x-value of the (0, x) root mirror locations for successive families of mirrors in the system. Row 661 represents declination angle values for mirror normal vectors of root mirrors in successive mirror families. Families of mirrors are created as described previously from these root locations. For example, the mirror family track calculated for 4.88 degrees mirror declination at Sun altitude of 45 degrees is the same, identical track used by a mirror family with 7.38 degrees declination, but with Sun altitude of 50 degrees. Individual families in this design thus move to adjacent tracks to adjust for Sun declination variation. In the embodiment of FIG. 6A, every 5 degrees change in Sun declination requires all mirror families to change to their immediately adjacent track, thus allowing a continuously adaptable system that allows accurate Sun focus throughout the year.

The table of FIG. 6A shows that the declination values of mirrors in adjacent mirror families progress at 2.5 degrees per root location, as shown in row 661 from column to column for columns A through D. The value of 2.5 degrees is half the step value, 5 degrees, of the Sun noontime altitude (Sun declination) steps chosen for this example. This design of FIG. 6A is represented graphically in FIG. 6. The diagonal lines 670 show the shared root locations for several mirrors in the system and thus their shared paths or tracks at varying Sun declination values. While FIGS. 6 and 6A shown a step value of 5 degrees of Sun noon time altitude, other step values may also be used to achieve the a switchable track design that for tracking the Sun's seasonal declination.

Duty Cycled Rack and Pinion Speed Adjustment

One aspect of the system 100 comprises a drive mechanism. The drive mechanism moves a mirror or the mirror family train 511. The drive mechanism may be accomplished by a number of methods, such as by driving each mirror with an independent motor, using a single motor at the front of the train like a railroad train, using a single motor in the middle of the train creating a partial tow and partial push system, ground driven, such as a treadmill, ground motor tow with sprocket and chain, pulley and rope, or other conventional drive mechanisms or methods.

As the train is moved forward during the tracking period, a track determines the primary location of a particular mirror. The spacing between adjacent mirrors in a family is not constant, but rather increases as the distance from the focus increases as shown in FIG. 5 and FIG. 6. This means that as the mirror train advances during the tracking period, the mirrors at the leading and trailing ends of the train, for example mirrors 552 and 562 respectively, will have a greater translational velocity than those nearer to the focus, such as mirror 560. An individual mirror travels at a variable speed throughout the tracking period. The drive mechanism controls and varies the velocity of a given mirror throughout the tracking period. The drive mechanism may include a dedicated motor, a linkage to a neighboring mirror, or other movement means.

In one embodiment, the drive mechanism drives a driven mirror at an intermediate location in the mirror family train, which is linked to its neighboring mirror carriers. For example, mirrors 558, 554 are neighbor mirrors of mirror 556 and each mirror may have an associated mirror carrier, for example mirror carrier 902. A single motor (not shown) drives one or more mirror families, for example mirror family train 551. Each of the mirror carriers has a link 1012 to the neighboring mirrors' carriers. A train with a carrier 1030 driven at an intermediate location in the train will have a portion of its mirrors towed behind the driven carrier 1030 and another portion pushed forward of the driven carrier 1030.

In one aspect of the embodiment, the links 1012 attach individually to the center of mass of each carrier 1020. However, the links may also attach at other location on the carrier. The connection point at the center of mass of each carrier may comprise a zero-friction bearing to minimize rotational friction as the carrier moves on the track. The drive mechanism may drive the driven mirror using any conventional means, such as driven wheels with an integral motor, towed with a pulley arrangement by an anchored motor, pushed with a worm gear motor arrangement, or other means.

In one embodiment, the system 100 uses a passive rack and pinion mechanism 1000 to vary the velocity of travel of individual mirrors travel. The links between neighboring mirror carriers in the train are dynamically shortening or lengthening. The shortening or lengthening is achieved by using the passive rack and pinion mechanism 1000 on each mirror carrier which pulls or pushes a link bar 1012 connected to the next neighboring trailing mirror carrier, for example mirror carrier 1020 trails mirror carrier 1030.

Figure 10:
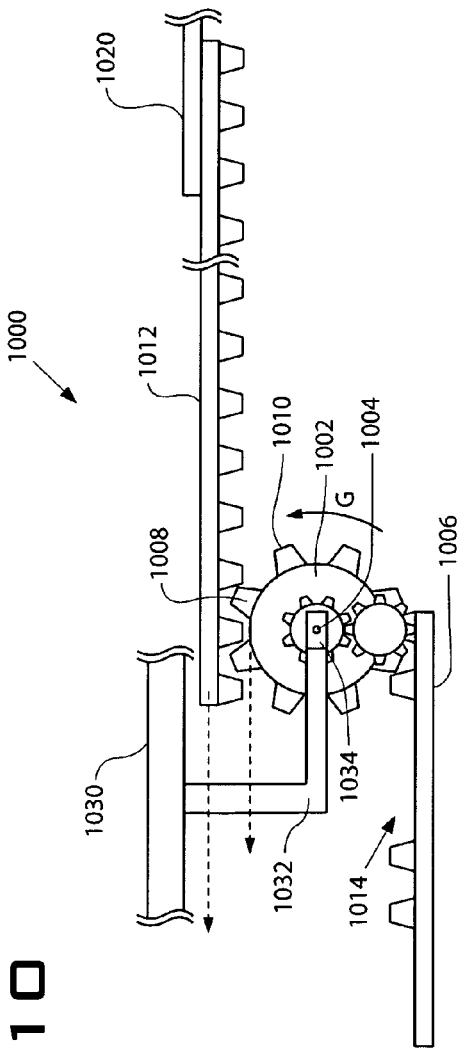
FIG. 10 is a schematical side view of a rack and pinion mechanism of the present invention.

As shown in FIG. 10, in the forward direction, the pinion, or cogwheel 1002 is attached to the driven mirror carrier 1030 with linkages 1032 and 1034. The cogwheel axis hub 1004 travels at the same speed as the carrier 1030. The cogwheel 1002 turns when it is in contact with a first rack of teeth 1006 anchored to the ground so that as the mirror carrier moves forward at velocity v relative to the ground, the cogwheel spins in the same direction, direction G as shown in FIG. 10, as the mirror carrier wheels. At the top 1008 of the cogwheel 1002, the teeth are moving in the same direction as the train and at tangential velocity 2v.

A link 1012 is attached to the trailing mirror carrier 1020 as described above. The opposite, toothed section of the stem is engaged with the top 1008 of the cogwheel 1002 of the driven mirror carrier. As the driven carrier 1030 is moved forward at velocity v, and its cogwheel 1002 engages the toothed rack 1006 on the ground, its cogwheel 1002 spins so that the top of the cogwheel 1008 moves at a tangential velocity 2v and thus pulls the toothed link 1012 and the trailing mirror carrier 1020 forward at 2v.

To adjust the relative velocity between adjacent mirror carriers as the tracking period/cycle progresses, a first ground track 1006 and a second ground track 1102 two separate, stationary racks are used, depending on whether a mirror needs to increase or decrease distance to its neighbors. For example, the distances between mirrors must decrease as the mirrors approach the focus axis or the zero line in FIG. 5, and the distance between mirrors must increase as they move away from the focus axis or zero line in FIG. 5.

Decreasing Distance Between Mirrors or Towing

As shown in FIG. 10, to decrease the distance between mirrors, the ground rack of teeth (the cogwheel contact point on the ground) is a stationary rack 1006 with a tooth sequence containing intermittent gaps 1014 to duty cycle the cogwheel 1002 spin. The cogwheel 1002 will turn when its teeth 1010 are engaged with the stationary rack 1006 positioned below the cogwheel 1002, and the cogwheel 1002 will not turn when there are no teeth below the cogwheel 1002. For forward, or towing operation, the range of achievable velocities of neighboring carriers 1020 is minimum v (the velocity of the driven carrier 1030) and maximum 2v. The relative speed of neighbor mirrors ranges from zero to v.

As an example, a 75% duty cycle would be created by the providing a ground track with a rack length L comprised of 10 teeth, followed by a gap with a length 0.333L (equivalent teeth=3.333) of no teeth, followed by a length L of 10 teeth again, repeating. The average speed of the adjacent carrier is then 13.33/[10/(2v)+3.333/(v)], or 1.60v. Similarly, a 67% duty cycle would be a length L of 10 teeth followed by a gap length 0.5L (equivalent teeth=5) of no teeth, followed by a length L of 10 teeth again repeating, for an adjacent carrier average speed of 15/[10/(2v)+5/(v)], or 1.5v. Similarly, a 90% duty cycle would be a length L of 10 teeth followed by a length 0.111L (equivalent teeth=1.111) of no teeth, followed by a length L of 10 teeth again repeating, for an adjacent carrier average speed of 11.111/[10/(2v)+1.111/(v)], or 1.82v. A table of adjacent carrier velocities relative to driven carrier velocity follows:

| Rack Duty Cycle | Trailing Carrier Velocity (lead carrier velocity = v) |
|---|---|
| 10% | 1.05 v |
| 20% | 1.11 v |
| 25% | 1.14 v |
| 50% | 1.33 v |
| 67% | 1.50 v |
| 75% | 1.60 v |
| 90% | 1.82 v |

The rearmost mirror carrier in a mirror family train begins tracking with the largest starting velocity. The $2^{nd}$-to-rear carrier will have a slightly smaller starting velocity and so forth. The velocity of the train is set at the driven carrier. The driven carrier 1030 may be at a forward mirror carrier position within the mirror family train. To move the train at this velocity successive rearward and forward carriers employ the rack and pinion mechanism 1000 to increase their relative velocities. The velocities are additive such that the rearmost and foremost carriers benefit from the velocity increases of all carriers in front or in back of them. Thus the duty cycle and velocity of an individual carrier must take into account the velocity increases achieved by all forward carriers. This also applies to carrier forward of driven carrier 1030. The design of the duty cycled ground rack 1006 determines relative velocities of directly neighboring carriers.

Increasing Distance Between Mirrors or Pushing

Figure 11A:
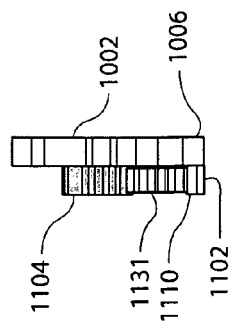
FIG. 11A is an end view of the rack and pinion mechanism of the present invention.
Figure 11:
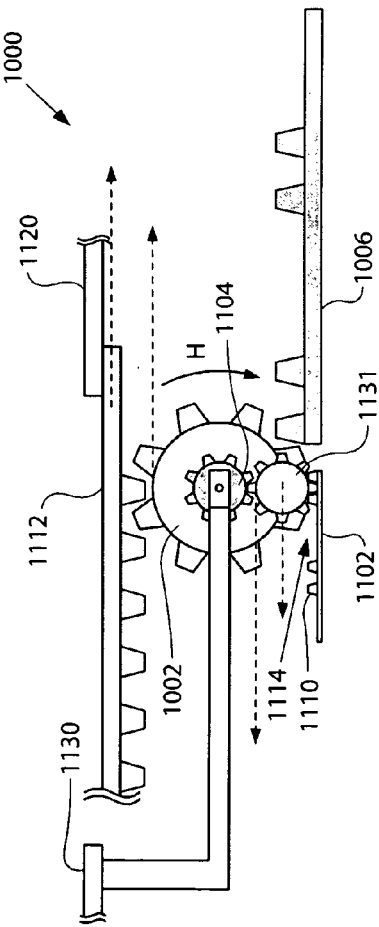
FIG. 11 is a schematical side view of the rack and pinion mechanism of the present invention.

As shown in FIG. 11, rack and pinion mechanism 1000 comprises a second ground rack 1102 for increasing the distance between mirrors as the train traverses the track. As shown in FIG. 11, the second rack 1102 is offset from the first rack 1006. The second rack 1102 engages with a reversing gear or second cogwheel 1131. The reversing gear 1131 engages a transmission gear 1104, which is affixed to the wheel 1002, or otherwise turns in sync with cogwheel 1002. The reversing gear 1131 causes the cogwheel 1002 to turn in the opposite direction as the carrier wheels 904a, 904b and causes a mirror carrier to increase distance relative to its neighbors.

As with the first rack 1006, the second rack 1102 teeth are duty cycled so that the cogwheel 1002 turns only when the reversing gear 1131 is engaged with the second rack 1102. To increase the distance between mirrors, the second rack 1102 has a tooth sequence containing intermittent gaps 1114 to duty cycle the second cogwheel 1131 spin. The transmission gear 1104 will turn when its teeth are engaged with the reversing gear 1131 and the reversing gear 1131 is engaged with the second rack 1102 positioned below the reversing gear 1131. The reversing gear 1131 will not turn when there are no teeth below the reversing gear 1131. The reversing gear 1131 is passive and turns when engaged with the second rack 1102.

The speed of a mirror relative to the velocity of its neighbor can be calculated based on the tooth duty cycle pattern on the rack 1102. Reversing gear 1131, when engaged with the teeth 1110 of ground rack 1102, through transmission gear 1104 causes the top of cogwheel 1002 to have a maximum tangential speed of −2v—rather than +2v in decreasing operation shown in FIG. 10—the speed of a trailing mirror carrier 1120 ranges from v to zero—rather than v to 2v for the decreasing operation. Zero velocity on the trailing mirror carrier 1120 corresponds to when the reversing gear 1131 in the leader mirror carrier is engaged with the teeth 1110 of the second rack 1102. In order to calculate the duty cycled velocities, the speed v is referred back to the trailing mirror, thus attaining a forward mirror speed range of v to 2v as in the towing case above. Using the trailing mirror velocity as v, the magnitudes of the calculated velocities vs. various duty cycles will be the same, but of different sign, reflecting the fact that the trailing mirror is continuously increasing in distance relative to the leader mirror.

| Rack Duty Cycle | Trailing Carrier Velocity (lead carrier velocity = v) |
|---|---|
| 10% | −1.05 v |
| 20% | −1.11 v |
| 25% | −1.14 v |
| 50% | −1.33 v |
| 67% | −1.50 v |
| 75% | −1.60 v |
| 90% | −1.82 v |

Rotation-Canceling Decreasing Gauge Track

As shown in FIG. 9, the rotation of the mirror carrier 902 is fixed relative to all axes by designing the track carrier system 912 to continuously counteract and prevent the mirror rotation as an individual mirror carrier 902 traverses the track 910a, 910b, as for example in direction E. The shape of the track 910a, 910b is a shallow curve with its apex near z=0 represented by line 916 in FIG. 9 and the vertical zero lines in FIGS. 5 and 6. As the mirror train traverses the curved track 910a, 910b, in direction E, the track 910a, 910b continuously curves to the right if it is a right-ward curving track where the mirrors at the edges of the system curve away from the target, such as those of mirror families 548, 546, 544, 542, 540 in FIG. 5. The track 910a, 910b continuously curves to the left if it is a left-ward curving track where the mirrors at the edges of the system curve toward the target, such as those of mirror families 538, 536, 534, 532, and 530.

In a conventional parallel track system, shown by tracks 940a, 940b, the mirror carrier would experience a continuous rotation to the right as it traverses the right-curving track. This rotation is shown in FIG. 9 by mirror carrier 946, 944, 942, 941. However, the track 912 in this invention counteracts and prevents rotation by utilizing rails 910a, 910b that are not parallel. Each mirror carrier 902 has a pair of wheels 904a, 904b that ride along the track path 920 on rails 910a, 910b during the tracking period. The wheels 904a, 904b pivot freely on an axis parallel to the y-axis in the mirror carrier base. In the case of a right-ward curving track, such as the track of mirror family 548, as the track path curves to the right in the F direction, the track gauge, track gap 922, or the distance between the two tracks decreases. Therefore the distance between the rails at the position of mirror carrier 902 in FIG. 9 is greater than the distance between rails at the position of mirror carrier 902e. As the mirror carrier 902 encounters the narrowing of the track gap 922, the z-axis and x-axis orientation of the mirror carrier 902 are forced to remain constant as the track curves. The track gap 922 counteracts and prevents carrier rotation generally caused by traversing a curved track path.

In one embodiment, the system 100 comprises a non-parallel curved track configuration as shown in FIGS. 9, 9A, 12, 12A, 12B, 12C. The centroid of the mirror follows the path of the mirror family maintaining focus on the target. The design for the trailing mirror in the family is the starting location for initiating the track design. In one embodiment, the mirror carrier 902 is a rectangle shape, however the mirror carrier may be other shapes. The mirror carrier 902 is mounted on wheels 904a, 904b located on opposing corners of a rectangle shaped mirror carrier 902.

The starting location of the trailing mirror in a declination family is calculated. The trailing mirror is oriented with the centroid line 920 at the design location $(z_a, x_a, 0)$ and properly oriented for declination ($\delta$) and hour angle ($\tau$). Next mount the two y-axis-pivoting wheels 904a, 904b so that each wheel is on opposing corners of a square mirror carrier 902 which has sides parallel to the x and z axes. The wheels 904a, 904b are the same distance h from the centroid path 950. But the wheels offset along the Z axis so that the inside wheel 904a on the inside rail 910a (the rail on the right hand side while facing forward in tracking direction for a right-ward curving track) leads the wheel 904b on the outside rail 910b. In FIG. 9, the target is located in the H direction from the outside rail 910b, and is closer to the outside rail 910b than the inside rail 910a. The track gauge 922 at this location is calculated according to this formula $2*h*\sin(\pi/4+m)$, where m is the slope of the track path in the z-x plane for a particular location or mirror family located at $(z_a, x_a, 0)$ relative to $(0, 0, 0)$. The $\pi/4$ adder is unique to choosing a square as the template. A different angle value would occur for a template with a different rectangular aspect ratio. The track curve shown in FIG.

9 bends continuously to the right, and the variable m for that track curve is continually decreasing as the track is traversed in the E direction. Therefore, for each mirror locus calculated, a unique value of m and thus track gauge is defined. Calculating a track gauge for a number of mirror loci along a centroid path 920 defines the 2-rail non-parallel rotation-nulling track 912.

Figure 12:
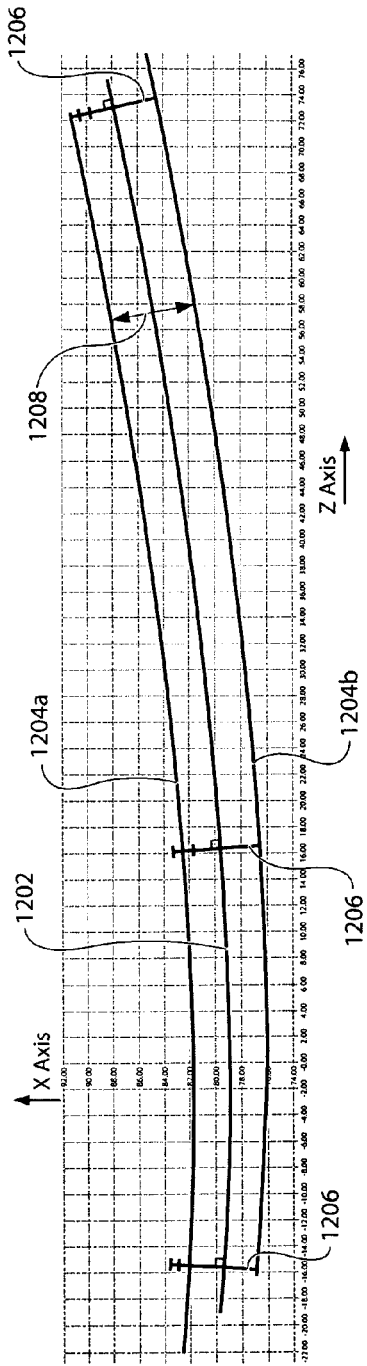
FIG. 12 is a schematical view of the track carrier system of the present invention.
Figure 12B:
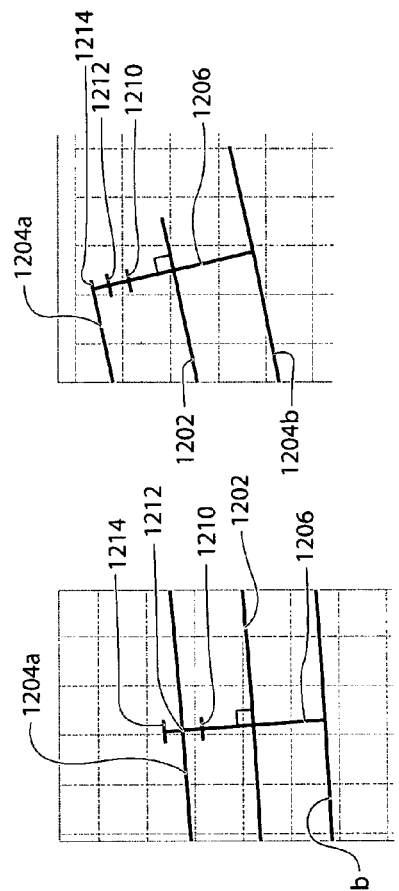
FIG. 12B is an enlarged schematical view of a portion of the track carrier system taken from FIG. 12.
Figure 12A:
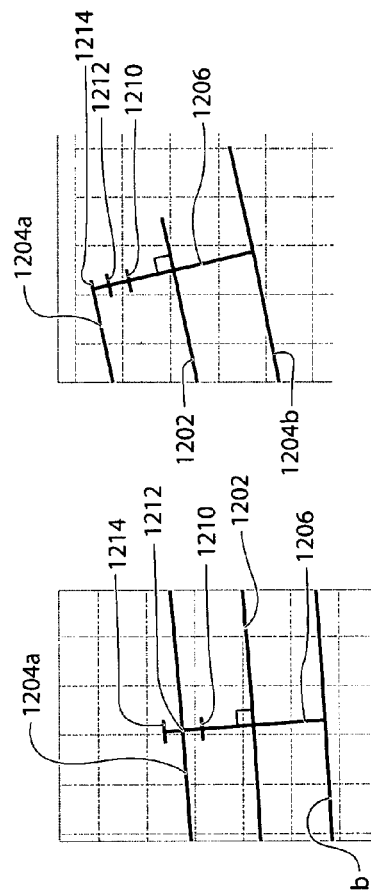
FIG. 12A is an enlarged schematical view of a portion of the track carrier system taken from FIG. 12.
Figure 12C:
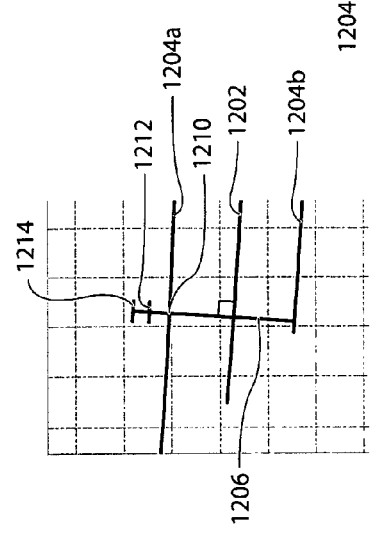
FIG. 12C is an enlarged schematical view of a portion of the track carrier system taken from FIG. 12.

FIG. 12 shows a mirror centroid path 1202 throughout a 2-hour tracking period. The wheels 904a, 904b of the mirror carrier travel along the rails 1204a, 1204b. A gauge tool 1206 may be used to align and set the track gauge 1208. The gauge tool 1206 has a number of alignment points 1210, 1212, 1214 for setting the track gauge 1208 to prevent carrier rotation and to focus the light from the mirror of the mirror carrier on the target. In one embodiment, the track gauge 1208 is set at three alignment points 1214, 1212, 1210 for setting the track gauge at a start position of the track, a middle position of the track, and an end position of the track, respectively. While the gauge tool 1206 has three alignment points, the tool may have any number of alignment points calibrated for setting the track gauge at specific points along the track. Increase in the number of alignment points for aligning track gauge at a corresponding number of points will increase the focus accuracy of the system and ensure each point along the track is correctly positioned for maintaining mirror focus on the target. Also, for longer tracking durations, additional wheels may be placed on the carrier to maintain carrier stability as the track gauge 922 between the tracked wheels 904a, 904b becomes narrow.

In another embodiment, one or more motors or other mechanical means are used to pivot individual mirrors on their y-axis to achieve rotation canceling while traversing a path using a parallel track.

Linear Tracking Path

Figure 13:
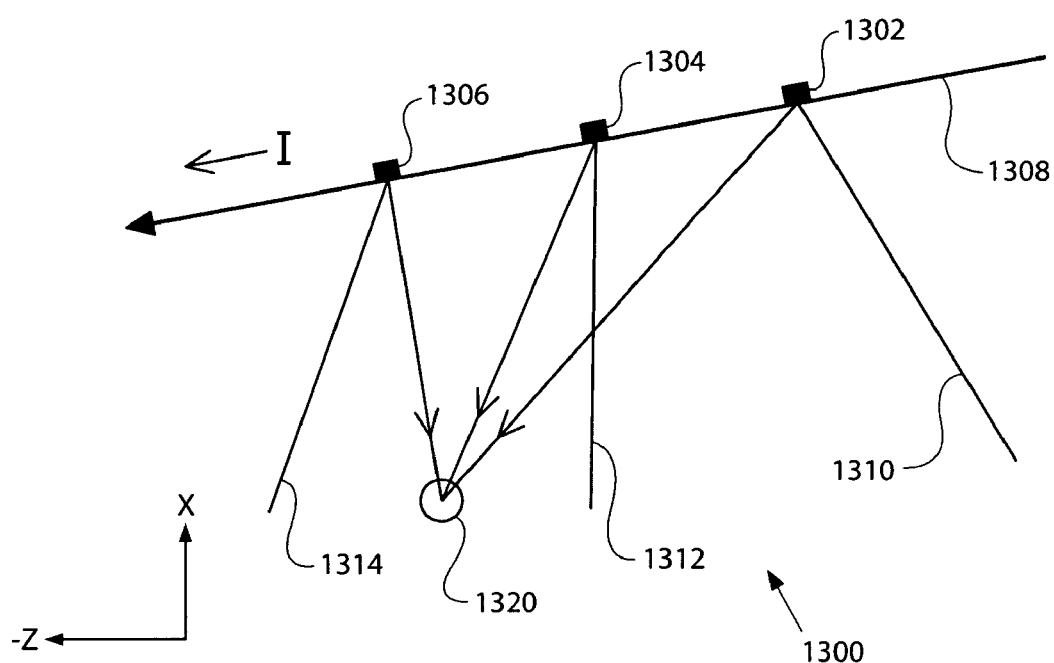
FIG. 13 is a schematical top view of an alternative embodiment providing a linear path concentrator.

FIG. 13 shows an alternative embodiment of the system, that uses a linear path 1308 rather than a curved path. Mirror 1302 is shown in FIG. 13 at different times during the tracking period focusing light 1310, 1312, 1314 on the target, where mirrors 1304 and 1306 represent mirror 1302 at progressively later times in the tracking period in the forward direction I. The linear path concentrator 1300 may be created where the system is divided in to linear segments. The path 1308 for the mirror 1302 or mirrors can be approximated by a straight line to focus light on the target 1320. Certain linear segments will provide mirrors that deviate from direct focus on the target 1320 at certain points in the tracking period. The larger linear segments will generate a mirrors positioned having a greater deviation from direct focus during certain points in the tracking period than will shorter linear segments. In another embodiment the spacing between mirrors can be approximated as equal.

Single Axis: Variable Hour Angle

The establishment of mirror orientation based on celestial angular coordinates enables the unique and novel translational tracking method. The translational tracking method eliminates the need to rotate individual mirrors thus greatly simplifying the design, assembly and maintenance and improving the mechanical robustness of the implementation.

Celestial hour angle and declination angle are established from two axes of rotation: a first axis parallel to the Earth's rotational axis and a second axis perpendicular to and intersecting the first axis. Rotation of the first axis determines the hour angle and rotation of the second axis determines the declination angle. Prior art heliostat designs that alter terrestrial azimuth and altitude, rather than celestial angle, must utilize variable speed drive mechanisms, such as motors, on these altazimuthal axes of rotation.

In an alternate embodiment, the system enables Sun tracking while allowing a mirror to remain stationary. Using the previously described mathematics, it can be seen that once the mirror normal declination angle has been set for a given day, rotating the mirror about the hour angle axis is sufficient to track the movement of the Sun. This effectively reduces the complexity from existing stationary heliostats from 2-axis to single axis tracking. Further, the rotation of the mirror is at a constant speed of 7.5 degrees per hour (half the Sun's rate), which is improvement in drive complexity over existing heliostats which must vary the rotation speed of both axes. This embodiment enabling a constant speed and single axis rotation, greatly simplifies the heliostat tracking design and implementation.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Other Applications

The disclosed invention and its application may be applied to focus and/or track any source which emits, reflects, refracts, or otherwise emanates acoustic or electromagnetic radiation. The location of the source may be characterized by celestial coordinates but may be characterized by other coordinate systems. Examples of emitting sources might include stars, galaxies, planets, celestial radio sources (radio astronomy), or celestial gamma-ray, x-ray or cosmic-ray sources. Emanating sources might also be terrestrial such as radio transmitter sources, audio sources, light or other radiation sources, and may or may not require tracking. In focusing these other celestial or terrestrial sources, the same mirror concentrating system design as described above may be used.

To generalize the design for non-solar celestial sources from that used for the Sun as described in previous sections, it must be understood that all celestial sources which traverse the sky do so on a particular line of declination, as does the Sun, and all celestial sources peak in altitude as they cross the local meridian westward, as does the Sun. The local meridian can be defined as the line on the celestial sphere that passes through the zenith and intersects the horizon at due south and due north. However, celestial sources outside the Solar System do not vary in declination as the Sun does, so no declination adjustment is required in the tracker for sources outside the solar system. For example, to track the star Sirius, one would determine its declination—which is constant throughout the year (unlike the Sun)—such as from a star chart, and design the tracker as described in the previous sections, understanding that the term "noontime altitude" when the Sun is the source is replaced with $(90-\text{Latitude}) + \delta_{Sirius}$ which is the altitude of Sirius above the horizon when it is on the local meridian. A Sirius tracker could thus be designed as described in previous sections and used at any time of the year, day or night, without having to adjust declination angle. Any celestial object within the Solar System (planets, the Moon, Asteroids) has the same declination variation as noted with the Sun.

Terrestrial, stationary sources might also be focused using the disclosed invention. For example, it may be desired to provide concentration of a distant, stationary light, acoustical or radio source onto a target area. The terrestrial source location may be converted into celestial coordinates using the astronomical positioning conversion mathematics described above, and with a designated target area location, a stationary tracker can be designed in the same manner as that described above for a moving source. In the case of a stationary source, the mirror families remain stationary.

The invention described herein may also be used in reverse, that is, to provide a source at the target area and project the source radiation out onto the sky via the mirror families. In this case, when the mirror families are translated, they project a spot of light, radio or acoustic radiation out onto the sky which travels on an arc and mimics the traversal of a celestial object through the sky. The translational speed of the mirrors might be varied to make the projected spot travel faster or slower against the sky.

Target Area

The size of the target area 120 in a particular tracker design is determined by the size of the mirrors in the tracker. The size of the collected light in a Sun tracker with perfectly calibrated mirrors is the same size as the largest of any one of the individual mirrors. Thus the minimum possible focused light spot size on the target is the size of a mirror in the system. The target area may be chosen to be larger than an individual mirror size to account for variation in the mirror angle calibration process. A perfectly calibrated square mirror, one foot on a side, with target 100 feet away, has zero degrees angle error, and the target area radius should be $100*\mathrm{Tan}(0°)+0.5=0.5$ feet (one half mirror length). To account for a 1 degree variation in a 1 foot mirror with a target 100 feet distant, the target area size should have a radius of $100*\mathrm{Tan}(1°)+0.5=2.2$ feet. Similarly, a 0.25 degree calibration process variation requires the target area radius to be $100*\mathrm{Tan}(0.25°)+0.5=0.9$ feet. Thus it can be shown that the target area size can be set to account for variations in the mirror calibration process. It can also be shown that, if mirror angle error is intentionally designed into the system, the target area can be made a variety of sizes, or could be designed to concentrate the source light onto multiple target locations. If the target area is less than the largest individual mirror of the system, then at least some reflected radiation will be lost as the radiation is projected outside the target area. The target area may be a physical object, but is not required to be a physical object. The target area maybe a location or area of space.

What is claimed is:

1. A tracking system for reflecting electromagnetic radiation from a moving electromagnetic radiation emanating source to a stationary target area, comprising:
   at least one reflecting surface mounted to a support that fixes the reflecting surface in a focus orientation to focus electromagnetic radiation on the target area when the reflecting surface is at a first location at a first predefined time; and
   a path having at least the first location and a second location, the reflecting surface mounted to the support providing the reflecting surface with the focus orientation and positioned at the second location focuses electromagnetic radiation on the target area at a second predefined time, the reflecting surface movable along the path to maintain electromagnetic radiation focused on the target area across a predefined range of time.

2. The system of claim 1, wherein the focus orientation of the reflecting surface provides the reflecting surface with a normal vector having an unchanging hour angle and an unchanging declination angle, wherein each location of the path positions the reflecting surface, having the focus orientation, to focus electromagnetic radiation on the target area at a predefined time; the predefined range of time spans less than 24 hours.

3. The system of claim 1, wherein the support is a non-rotating support; and the reflecting surface is movable along the path to maintain focus on the target area throughout a tracking period while maintaining the reflecting surface in the focus orientation: the focus orientation of the reflecting surface being fixed relative to the local horizon plane.

4. The system of claim 1, wherein the at least one reflecting surface comprises a plurality of reflecting surfaces; each reflecting surface having a focus orientation fixed for focusing electromagnetic radiation on the target area based on the reflecting surface location at a predefined time.

5. The system of claim 1, wherein the path is linear; and wherein at least one of the locations on the path positions the reflecting surface to deviate from exactly focusing electromagnetic radiation on the target area at a predefined time, where the deviation is within a predefined range.

6. The system of claim 1, wherein the path comprises a plurality of adjacent paths, and wherein the adjacent paths are configured so that the reflecting surface oriented for a first path of said plurality of adjacent paths at a first predetermined time with a fixed declination angle will focus electromagnetic radiation on the target area when positioned on a second path of said plurality of adjacent paths at a second predetermined time to account for a seasonal change in the declination angle of the electromagnetic radiation emanating source.

7. The system of claim 1, wherein said first predefined time and said second predefined time each comprise a span of time.

8. The system of claim 1, wherein the at least one reflecting surface comprises:
   a plurality of reflecting surfaces; each reflecting surface having a unique focus orientation fixed to focus electromagnetic radiation on the target area when the reflecting surface is at a first location at a first predefined time;
   a carrier with a drive mechanism that varies the distance between each reflecting surface as each reflecting surface moves along the path to maintain each reflecting surface focusing electromagnetic radiation on the target area during a tracking period without changing each reflecting surface from its corresponding unique focus orientation; and,
   the supports are connected to the carrier.

9. The system of claim 8, comprising a drive mechanism for varying the velocity of each reflecting surface as it moves along the path.

10. The system of claim 8, wherein the drive mechanism increases the distance between adjacent reflecting surfaces as reflecting surfaces move generally away from a zenith axis of the target area along the path.

11. The system of claim 8, wherein the drive mechanism decreases the distance between adjacent reflecting surfaces as reflecting surfaces move generally toward a zenith axis of the target area along the path.

12. The system of claim 8, wherein the carrier provides the reflecting surfaces two translational degrees of freedom of movement in the horizontal plane while maintaining each reflecting surface normal vector at a fixed hour angle and a fixed declination angle.

13. The system of claim 8, wherein the plurality of reflecting surfaces are grouped to a plurality of reflecting surface families; and wherein the path comprises a plurality of paths corresponding to the plurality of reflecting surface families, and each reflecting surface of a reflecting surface family having a normal vector with fixed declination angle, where the normal vector of each reflecting surface in the reflecting surface family have the same declination angle.

14. The system of claim 8, wherein the plurality of reflecting surfaces are grouped to a plurality of reflecting surface families; and wherein the path comprises a plurality of paths corresponding to the plurality of reflecting surface families, wherein the paths are configured so that reflecting surfaces with a common fixed declination angle oriented to focus electromagnetic radiation on the target area from the first path at a first predetermined time will focus electromagnetic radiation on the target area when positioned on a second path at a second predetermined time to account for a seasonal change in the declination angle of the electromagnetic radiation emanating source.

15. A solar tracking system for reflecting light from a moving light source on to a target area, comprising:
   at least one reflecting surface mounted to a support that fixes the reflecting surface in a fixed orientation to provide a normal vector of the reflecting surface with an unchanging hour angle and unchanging declination angle to focus light on the target area from a first location at a first predefined time; and
   a path having at least the first location and a second location, the second location positions the reflecting surface with the fixed orientation to focus light on the target area at a second predefined time.

16. The system of claim 15, comprising a carrier, the support mounted to the carrier, and the path comprises a track, the carrier translated along the track in a plane of translation to position the reflecting surface to maintain focus on the target area throughout a tracking period; the fixed orientation of the reflecting surface being fixed relative to the plane of translation.

17. A method of reflecting electromagnetic radiation from a moving electromagnetic radiation emanating source to a target area, comprising the steps of:
   fixing the orientation of a reflecting surface in a focus orientation to focus electromagnetic radiation on the target area at a first predefined time from a first location;
   providing the reflecting surface in the focus orientation at the first location at the first predefined time to focus electromagnetic radiation on the target area at the first predefined time; and
   moving the reflecting surface along a path to a second location to focus electromagnetic radiation on the target area at a second predefined time with the reflecting surface in the focus orientation.

18. A method of claim 17, wherein the step of moving comprises the step of maintaining the reflecting surface in the focus orientation between the first location and the second location, the focus orientation providing the reflecting surface with normal vector at a fixed declination angle and a fixed hour angle; and wherein the step of moving is further defined in that the second predefined time is within 23 hours of the first predefined time.

19. A method of claim 17, wherein the step of fixing comprises, fixing the orientation of a plurality of reflecting surfaces in a corresponding plurality of independent focus orientations to focus electromagnetic radiation on the target area at a first predefined time from a plurality of first locations along a path where the normal vector of each reflecting surface along the path share a common declination angle; and,
   wherein the step of providing comprises providing each reflecting surface at a corresponding first location in the corresponding independent focus orientation to focus electromagnetic radiation on the target area at the first predefined time; and
   wherein the step of moving comprises moving each reflecting surface to a second location to focus electromagnetic radiation on the target area at a second predefined time with each reflecting surface maintained in the independent first orientation, where at least one first location of one of the reflecting surfaces is a second location of a different reflecting surface.

20. A method of claim 17, wherein the step of fixing comprises, fixing the orientation of a plurality of reflecting surfaces in a corresponding plurality of unique focus orientations to focus electromagnetic radiation on the target area at a first predefined time from a plurality of first locations corresponding to the plurality of reflecting surfaces, where the plurality of first locations are located on at least two paths comprising a first path and a second path, where the normal vector of each reflecting surface located along the first path share a common first declination angle and the normal vector of each reflecting surface located along the second path share a common second declination angle; and
   wherein the step of providing comprises the steps of:
      grouping reflecting surfaces into a number of reflecting surface families corresponding to the number of paths,
      providing each reflecting surface in the corresponding unique focus orientation at a corresponding first location to focus electromagnetic radiation on the target area at the first predefined time; and
   wherein the step of moving further comprises the step of moving all reflecting surfaces of the first path to an adjacent second path while maintaining each of the reflecting surfaces in their corresponding unique focus orientations where electromagnetic radiation is then focused on the target area to account for a seasonal change in the declination angle of the electromagnetic radiation emanating source.

* * * * *